(12) United States Patent
Wright

(10) Patent No.: US 9,946,549 B2
(45) Date of Patent: Apr. 17, 2018

(54) REGISTER RENAMING IN BLOCK-BASED INSTRUCTION SET ARCHITECTURE

(71) Applicant: QUALCOMM Incorporated, San Diego, CA (US)

(72) Inventor: Gregory Michael Wright, Chapel Hill, NC (US)

(73) Assignee: QUALCOMM Incorporated, San Diego, CA (US)

( * ) Notice: Subject to any disclaimer, the term of this patent is extended or adjusted under 35 U.S.C. 154(b) by 509 days.

(21) Appl. No.: 14/639,085

(22) Filed: Mar. 4, 2015

(65) Prior Publication Data

US 2016/0259645 A1     Sep. 8, 2016

(51) Int. Cl.
*G06F 9/38*     (2018.01)
*G06F 9/30*     (2018.01)

(52) U.S. Cl.
CPC .......... *G06F 9/384* (2013.01); *G06F 9/30145* (2013.01); *G06F 9/3836* (2013.01)

(58) Field of Classification Search
CPC ..... G06F 9/384; G06F 9/30145; G06F 9/3836
See application file for complete search history.

(56) References Cited

U.S. PATENT DOCUMENTS

| | | | |
|---|---|---|---|
| 5,671,383 A | | 9/1997 | Valentine |
| 6,061,777 A | * | 5/2000 | Cheong ................. G06F 9/3863 712/205 |
| 7,076,640 B2 | | 7/2006 | Kadambi |
| 7,809,926 B2 | | 10/2010 | Martinez et al. |
| 7,822,948 B2 | | 10/2010 | Lewis |
| 8,180,997 B2 | | 5/2012 | Burger et al. |
| 2002/0016907 A1 | | 2/2002 | Grochowski et al. |
| 2005/0005084 A1 | | 1/2005 | Burger et al. |
| 2008/0109637 A1 | * | 5/2008 | Martinez ............. G06F 9/30181 712/29 |

(Continued)

OTHER PUBLICATIONS

Kim C., et al., "Composable LightWeight Processors", 40th IEEE/ACM International Symposium on Microarchitecture, 2007, pp. 381-393.

(Continued)

*Primary Examiner* — Keith E Vicary
*Assistant Examiner* — William V Nguyen
(74) *Attorney, Agent, or Firm* — Muncy, Geissler, Olds & Lowe, P.C.

(57) ABSTRACT

An apparatus for mapping an architectural register to a physical register can include a memory and control circuitry. The memory can be configured to store an intra-core register rename map and an inter-core register rename map. The intra-core register rename map can be configured to map the architectural register to the physical register of a core of a multi-core processor. The inter-core register rename map can be configured to relate the architectural register to an identification of the first core in response to determining that the physical register is a location of a most recent write to the architectural register that has been executed by the first core, is executing on the first core, or is expected to execute on the first core, the most recent write according to program order. The control circuitry can be configured to maintain the intra-core register rename map and the inter-core register rename map.

24 Claims, 26 Drawing Sheets

(56) References Cited

U.S. PATENT DOCUMENTS

| | | |
|---|---|---|
| 2009/0177868 A1* | 7/2009 | Lewis .................. G06F 9/3838 712/215 |
| 2010/0146209 A1 | 6/2010 | Burger et al. |
| 2010/0325395 A1 | 12/2010 | Burger et al. |
| 2011/0060889 A1 | 3/2011 | Burger et al. |
| 2011/0072239 A1 | 3/2011 | Burger et al. |
| 2013/0283022 A1 | 10/2013 | Sasanka et al. |
| 2014/0181475 A1 | 6/2014 | Abdallah |

OTHER PUBLICATIONS

Robatmili B., et al., "How to Implement Effective Prediction and Forwarding for Fusable Dynamic Multicore Architectures", Appears in the Proceedings of the 19th IEEE International Symposium on High-Performance Computer Architecture (HPCA-19), 2013, pp. 1-12.
Yeager, K C., "The Mips R10000 Superscalar Microprocessor," IEEE Micro, vol. 16, Issue 2, IEEE, Apr. 1996, pp. 28-40.
International Search Report and Written Opinion—PCT/US2016/016132—ISA/EPO—dated Apr. 28, 2016.
Smith A., et al., "Compiling for EDGE Architectures", Fourth International Symposium on Code Generation and Optimization (CGO'06), Mar. 26-29, 2006, IEEE, US, Mar. 26, 2006, XP058144521, pp. 185-195.

* cited by examiner

REGISTER RENAMING IN BLOCK-BASED INSTRUCTION SET ARCHITECTURE

INTRODUCTION

1. Field

Aspects disclosed herein relate generally to mapping an architectural register to a physical register, and particularly to mapping an architectural register to a physical register in an environment of a block-based instruction set architecture.

2. Description of the Related Art

A computer program represents an algorithm as a sequence of instructions. The order of the sequence is referred to as the program order. Typically, instructions in a computer program represented in a source code, understandable to a programmer, are recast by a compiler into a machine code executable by a processing unit. As consumers have provided a market for an ever increasing number of application programs, the electronics industry has sought to increase the speed of processing units.

The ability to execute multiple instructions concurrently (i.e., parallel processing) is one method to increase the speed of processing units. In parallel processing, the processing unit includes a plurality of execution units. Very Long Instruction Word (VLIW) is a processor architecture design that presents one approach to parallel processing. In the VLIW architecture, instructions are grouped in a bundle. Usually, the instructions within the bundle are independent of each other. Additionally, the VLIW architecture is configured so that instructions in the bundle are usually fetched and scheduled for execution as a unit. In another approach to parallel processing, an instruction is executed by an execution unit in response to all of the operands needed by the instruction having been received by the execution unit. Because it is possible, using this approach, that a first instruction is executed by a first execution unit before a second instruction is executed by a second execution unit, even though the first instruction is positioned later in the program order than the second instruction, such a processing unit can be referred to as an out-of-order (OOO) processing unit.

A block-based instruction set architecture can be configured to operate with an OOO processing unit configured according to a block-based microarchitecture. In a block-based instruction set architecture, the instructions in the computer program can be assigned to groups, which can also be referred to as blocks. In a block-based microarchitecture, a computer processor core of the computer processing unit can be configured to execute a block of instructions as a unit.

However, because a computer program typically includes a situation in which a result of a first instruction (i.e., a producing instruction) is an operand for a second instruction (i.e., a consuming instruction), implementations of an OOO processing unit need to consider the situation in which an operand of the consuming instruction is dependent upon the producing instruction. A delay (i.e., latency) that occurs when the consuming instruction is waiting for the producing instruction to make its result available to the consuming instruction can undermine the advantage of parallel processing.

SUMMARY

An exemplary aspect can be directed to an apparatus for mapping an architectural register to a physical register. The apparatus can include a memory and control circuitry. The memory can be configured to store an intra-core register rename map and an inter-core register rename map. The intra-core register rename map can be configured to map the architectural register to the physical register of a core of a multi-core processor. The inter-core register rename map can be configured to relate the architectural register to an identification of the first core in response to determining that the physical register is a location of a most recent write to the architectural register that has been executed by the first core, is executing on the first core, or is expected to execute on the first core, the most recent write being according to a program order. The control circuitry can be configured to maintain the intra-core register rename map and the inter-core register rename map.

Another exemplary aspect can be directed to another apparatus for mapping an architectural register to a physical register. The other apparatus can include means for mapping the architectural register to the physical register of a core of a multi-core processor and means for relating the architectural register to an identification of the core in response to determining that the physical register is a location of a most recent write to the architectural register that has been executed by the core, is executing on the core, or is expected to execute on the core, the most recent write being according to a program order.

Yet another exemplary aspect can be directed to a method for executing a read instruction on a multi-core processor. An intra-core register rename map, of a first block of instructions, can be referenced to determine if a physical register, of a first core of the multi-core processor, is a location of a most recent write to an architectural register that has been executed by the first core, the most recent write being according to a program order. An inter-core register rename map, of the first core, can be referenced to determine if a second core, of the multi-core processor, includes a physical register that is the location of the most recent write to the architectural register that has been executed by the second core, is executing on the second core, or is expected to execute on the second core. A value can be read from the physical register of the second core in response to the second core including the physical register that is the location of the most recent write to the architectural register.

Still another exemplary aspect can be directed to a method for executing a write instruction on a block-based processor core. A value can be written to a physical register, of the block-based processor core, that corresponds to an architectural register. The write instruction can be an instruction of a first block of instructions. A second block of instructions that includes a subsequent write instruction for the architectural register can be determined. An intermediate block of instructions between the first block of instructions and the second block of instructions can be determined. An identification of the physical register can be recorded in a first field of a record of an intra-core register rename map associated with the intermediate block of instructions. A value of a second field of the record can be set to indicate that the physical register is a location of a most recent write to the architectural register that has been executed by the block-based processor core, the most recent write being according to a program order.

BRIEF DESCRIPTION OF THE DRAWINGS

These and other sample aspects are described in the detailed description, the appended claims, and the accompanying drawings.

Figure 1:
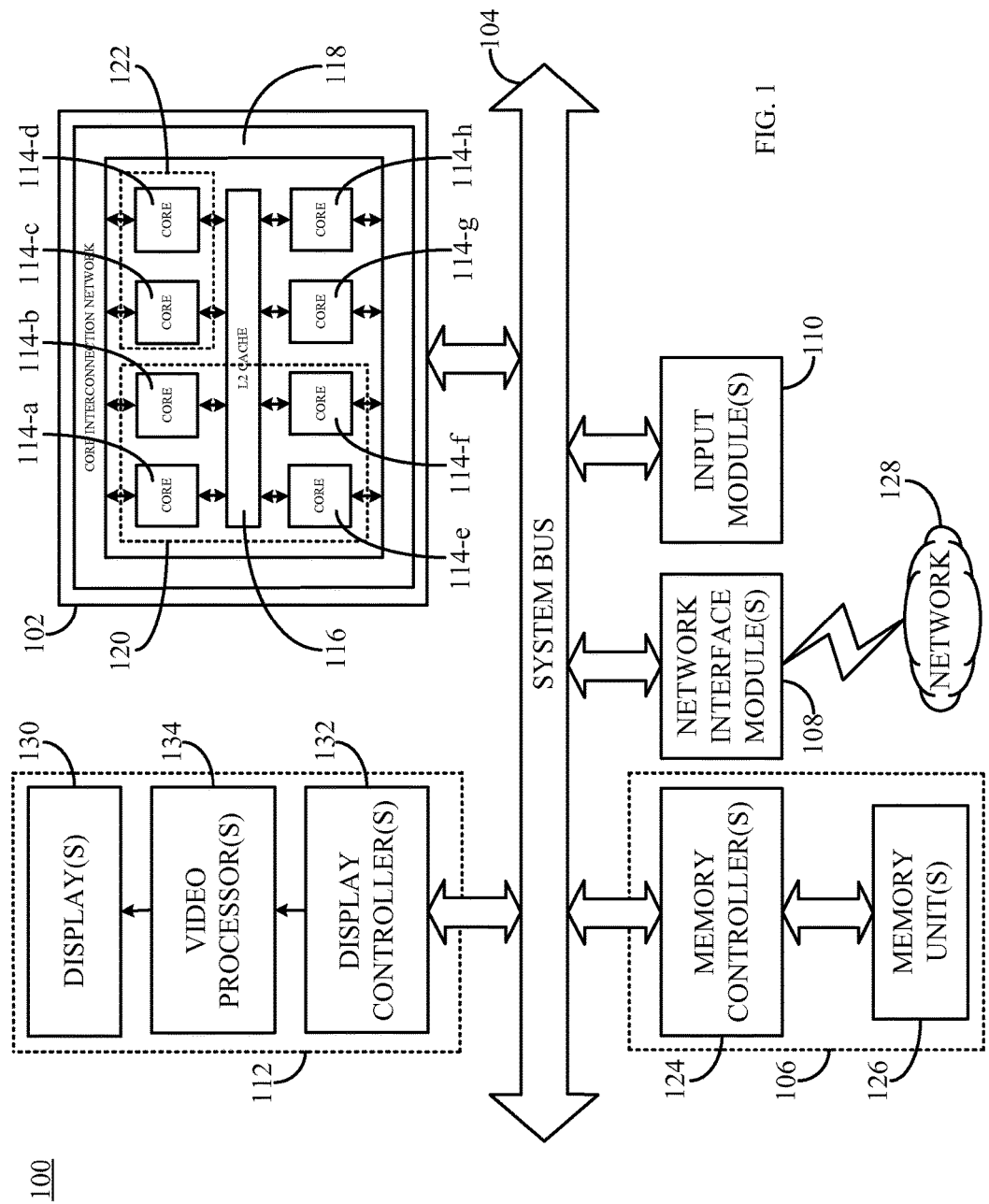
FIG. 1 is a block diagram illustrating an example of a system in which a block-based computer processing unit can operate.

In accordance with common practice, various features illustrated in the drawings may not be drawn to scale. Accordingly, dimensions of the various features may be arbitrarily expanded or reduced for clarity. In addition, implementations illustrated in the drawings may be simplified for clarity. Thus, the drawings may not illustrate all of the components of a given apparatus or device. Finally, like reference numerals may be used throughout the specification and the drawings to denote like features.

DETAILED DESCRIPTION

Aspects disclosed herein relate generally to mapping an architectural register to a physical register, and particularly to mapping an architectural register to a physical register in an environment of a block-based instruction set architecture.

A block-based instruction set architecture can be configured to operate with an out-of-order (OOO) processing unit configured according to a block-based microarchitecture. In a block-based instruction set architecture, the instructions in the computer program can be assigned to groups, which can also be referred to as blocks. An Explicit Data Graph Execution (EDGE) instruction set architecture can be an example of a block-based instruction set architecture. In a block-based microarchitecture, a computer processor core of the computer processing unit can be configured to execute a block of instructions as a unit.

The block-based computer processor core can include a plurality of execution units. An instruction of the block of instructions can be executed by an execution unit in response to all of the operands needed by the instruction having been received by the execution unit. It is possible that a first instruction can be executed by a first execution unit before a second instruction can be executed by a second execution unit, even though the first instruction is positioned later in the program order than the second instruction.

However, in general, the block-based computer processing unit can be configured so that, if a first block of instructions is positioned earlier in the program order than a second block of instructions, instructions of the first block of instructions commence being executed before instructions of the second block of instructions commence being executed.

The number of instructions in a block of instructions can be within a range, inclusively, from one to a maximum number. The maximum number can be defined with respect to the microarchitecture of the computer processor core. For example, the maximum number can be equal to a number of reservation stations in an array of reservation stations of a computer processor core. By way of example, and not by way of limitation, if an array of reservation stations of the computer processor core has 32 reservation stations, then the number of instructions in the block of instructions can be limited to a maximum number of 32.

In general, the compiler can be configured to assign instructions to blocks of instructions according to the program order of the instructions. However, the compiler can also be configured to identify or to predict dependencies among instructions and preferably to assign instructions to the blocks of instructions so that dependent instructions are assigned to the same block of instructions.

The block of instructions can include a block header. The block header can be used at least to identify instructions of one block of instructions and to distinguish this block of instructions from other blocks of instructions. In an aspect, the block header can include information to identify a number of instructions in the block of instructions.

Often, the computer program can include a sequence of instructions in the source code in which a first instruction (i.e., a causal instruction) is configured to determine a validity of a condition and a second instruction (i.e., an effectual instruction) is configured to be executed based upon a result of the causal instruction (e.g., a branching instruction (e.g., If X is true, Then Y)). Furthermore, sometimes there can be two effectual instructions configured so that a first effectual instruction (i.e., a valid condition instruction) is configured to be executed if the result of the causal instruction indicates that the condition is valid and a second effectual instruction (i.e., an invalid condition instruction) is configured to be executed if the result of the causal instruction indicates that the condition is not valid (e.g., If X is true, Then Y, Else Z).

However, in a block-based computer processor core it can be possible that at least one effectual instruction is executed before the causal instruction is executed (i.e., before the validity of the condition has been determined).

Because both the causal instruction and the effectual instruction(s) can be assigned to the same block of instructions, the block-based computer processor core can be configured so that results of instructions of a given block of instructions are speculative results until the block-based computer processor core determines which of the speculative results are authentic results. Speculative results can be stored in a buffer memory. The process of having the block-based computer processor core determine which of the speculative results of a given block of instructions are the authentic results can be referred to as having the block of instructions commit to the authentic results.

For example, if at least one valid condition instruction is executed before the causal instruction is executed (i.e., before the validity of the condition has been determined), the speculative result of this effectual instruction can be stored in the buffer memory. After the causal instruction executes to determine the validity of the condition, the block-based computer processor core can determine if the speculative result of the valid condition instruction is the authentic result. If the result of the causal instruction indicates that the condition is valid, then the block-based computer processor core can commit to the result of the valid condition instruction. Alternatively, for example, if at least one invalid condition instruction is executed before the causal instruction is executed (i.e., before the invalidity of the condition has been determined), the speculative result of this effectual instruction can be stored in the buffer memory. After the causal instruction executes to determine the invalidity of the condition, the block-based computer processor core can determine if the speculative result of the invalid condition instruction is the authentic result. If the result of the causal instruction indicates that the condition is invalid, then the block-based computer processor core can commit to the result of the invalid condition instruction. Although it is usually not the situation, it can be the case that both at least one valid condition instruction and at least one invalid condition instruction are executed before the causal instruction is executed (i.e., before the validity or invalidity of the condition has been determined). In this case, the speculative results of these effectual instructions can be stored in the buffer memory. After the causal instruction executes to determine the validity or the invalidity of the condition, the block-based computer processor core can determine if the speculative result of the valid condition instruction is the authentic result or if the speculative result of the invalid condition instruction is the authentic result. If the result of the causal instruction indicates that the condition is valid, then the block-based computer processor core can commit to the result of the valid condition instruction; if the result of the causal instruction indicates that the condition is invalid, then the block-based computer processor core can commit to the result of the invalid condition instruction.

In an aspect, the block-based computer processor core can be configured to have a block of instructions commit in response to execution of instructions, of the block of instructions, being in a particular state. In an aspect, a block of instructions can commit in response to completion of at least one of: (1) instructions, of the block of instructions, that write information to an architectural register, (2) instructions, of the block of instructions, that store information in a memory, or (3) an instruction, of the block of instructions, that branches to another block of instructions. In an aspect, the block header can include information to identify which of the architectural registers is an object of a write instruction, of the corresponding block of instructions, that is expected to execute on the block-based computer processor core. In an aspect, the block header can include information to identify which of the instructions, of the block of instructions, is expected to store information in the memory (i.e., a store instruction). In an aspect, the information in the block header to identify a store instruction can be indexed by a reference to an identification in the store instructions that indicates an order, according to the program order, in which the store instructions can be executed.

As described above, the block-based computer processor core can be configured so that at least one effectual instruction is executed before the causal instruction is executed. Additionally, the block-based architecture can be configured so that a result of a causal instruction can be an operand for an effectual instruction. In other words, the causal instruction can be a producing instruction and the effectual instruction can be a consuming instruction. In this case such an operand can be referred to as a predicate. Because a block-based architecture can be configured so that an instruction is not executed by an execution unit until all of the operands needed by the instruction have been received by the execution unit, having the result of the causal instruction be an operand for the effectual instruction advantageously can prevent the block-based computer processor core from needlessly executing the effectual instruction. Preventing the block-based computer processor core from needlessly executing the effectual instruction advantageously can reduce an amount of power consumed by the block-based computer processor core.

For example, the block-based architecture can be configured so that if the result of the causal instruction indicates that the condition is valid, this result can be a predicate operand for the valid condition instruction(s) so that the execution unit(s) for the valid condition instruction(s) can be configured to execute the valid condition instruction(s); however, this result would not be a predicate operand for the invalid condition instruction(s) so that the execution unit(s) for the invalid condition instruction(s) can be prevented from needlessly executing the invalid condition instruction(s). Likewise, for example, if the result of the causal instruction indicates that the condition is not valid, this result can be a predicate operand for the invalid condition instruction(s) so that the execution unit(s) for the invalid condition instruction(s) can be configured to execute the valid condition instruction(s); however, this result would not be a predicate operand for the valid condition instruction(s) so that the execution unit(s) for the valid condition instruction(s) can be prevented from needlessly executing the valid condition instruction(s).

As described above, both the causal instruction and the effectual instruction(s) can be assigned to the same block of instructions. Additionally, the causal instruction and at least one of the effectual instruction(s) can be assigned to different blocks of instructions. Because the causal instruction and at least one of the effectual instruction(s) can be assigned to different blocks of instructions, the block-based computer processor core can be configured to include a block predictor. The block predictor can be configured to predict which block of instructions, among the blocks of instructions included in the computer program, includes the at least one of the effectual instruction(s) that is likely to be executed based upon a result of the causal instruction included in a current block of instructions. In an aspect, the block predictor can use information in the block header of the current block of instructions to predict which block of instructions, among the blocks of instructions included in the computer program, includes the at least one of the effectual instruction(s) that is likely to be executed based upon the result of the causal instruction included in the current block of instructions. In an aspect, such a prediction can be made after the block header of the current block of instructions has been fetched, but before instructions of the current block of instructions commence being executed. In an aspect, as a result of such a prediction, after the instructions of the current block of instructions commence being executed, but before the instructions of the current block of instructions complete being executed, the block header of the block of instructions that includes the predicted at least one of the effectual instruction(s) that is likely to be executed based upon the result of the causal instruction can be fetched. In an aspect, as a result of such a prediction, after the instructions of the current block of instructions commence to be executed, but before the instructions of the current block of instructions complete being executed, instructions of the block of instructions that includes the predicted at least one of the effectual instruction(s) that is likely to be executed based upon the result of the causal instruction can commence being executed.

In an aspect, the block predictor can be configured to predict an execution path in a manner similar to that of a branch predictor in a conventional OOO computer processing unit. In an aspect, the compiler of a block-based computer processing unit can be configured to execute dataflow test instructions to convert branching instructions into a directed acyclic graph (DAG) of predicates. In an aspect, the block predictor can be configured to store predictions in prediction tables and to distribute at least portions of these prediction tables across block-based computer processor cores. In an aspect, the block predictor can be configured to produce information about a degree of confidence of a prediction. In an aspect, the block predictor can be configured to predict a next block of instructions to be executed following execution of a current block of instructions based upon the execution path determined by the predicates, a history of previously executed blocks of instructions, or both.

FIG. 1 is a block diagram illustrating an example of a system 100 in which a block-based computer processing unit 102 can operate. The system 100 can include by way of example, and not by way of limitation, at least one block-based computer processing unit 102, a system bus 104, at least one memory system 106, at least one network interface module 108, at least one input module 110, and at least one output module 112.

The at least one block-based computer processing unit 102 can include at least one block-based computer processor core 114, a level-2 (L2) cache 116, and, optionally, a core interconnection network 118. By way of example, and not by way of limitation, eight block-based computer processor cores 114-a, 114-b, 114-c, 114-d, 114-e, 114-f, 114-g, and 114-h are illustrated in FIG. 1. The at least one block-based computer processor core 114 can be configured to access the L2 cache 116 to receive at least one block of instructions to be executed, to store a result of an execution of the at least one block of instructions, or both.

In an aspect in which the block-based computer processing unit 102 includes multiple block-based computer processor cores 114, the core interconnection network 118 can be used to facilitate communication among the block-based computer processor cores 114. For example, the block-based computer processing unit 102 can be configured to cause, via the core interconnection network 118, the at least one block-based computer processor core 114 to be configured to operate independently, to be configured to operate in conjunction with at least one other of the at least one block-based computer processor core 114, or a combination of the foregoing. When the block-based computer processing unit 102 is configured to cause the at least one block-based computer processor core 114 to operate in conjunction with at least one other block-based computer processor core 114 such a configuration can be referred to as a core composition or a core fusion.

For example, to execute an application program in a parallel manner on multi-threaded sections, such as can be done by a graphics processing unit (GPU) or a digital signal processor (DSP), the block-based computer processing unit 102 can configure at least one block-based computer processor core 114 to operate independently on one of the multi-threaded sections and at least one other block-based computer processor core 114 to operate on at least one other of the multi-threaded sections. For example, to execute an application program efficiently on a single thread, such as can be done by a central processing unit (CPU), the block-based computer processing unit 102 can configure one block-based computer processor core 114 to operate in conjunction with at least one other block-based computer processor core 114. By way of example, and not by way of limitation, FIG. 1 illustrates a configuration in which: (1) each of the block-based computer processor cores 114-a, 114-b, 114-e, and 114-f is configured to operate in conjunction with each other of the computer processor cores 114-a, 114-b, 114-e, and 114-f as a first core composition 120, (2) the block-based computer processor core 114-c is configured to operate in conjunction with the block-based computer processor core 114-d as a second core composition 122, (3) the block-based computer processor core 114-g is configured to operate independently, and (4) the block-based computer processor core 114-h is configured to operate independently. First core composition 120 can be configured to execute a first application program. Second core composition 122 can be configured to execute a second application program. The block-based computer processor core 114-g can be configured to execute a first thread of a third application program and the block-based computer processor core 114-h can be configured to execute a second thread of the third application program. Alternatively, the block-based computer processor core 114-g can be configured to execute the third application program and the block-based computer processor core 114-h can be configured to execute the fourth application program.

The at least one block-based computer processing unit 102 can be coupled to the system bus 104 and can communicate with other devices of the system 100 by exchanging address, control, and data information via the system bus 104.

The at least one memory system 106 can include at least one memory controller 124 and at least one memory unit 126. The memory system 106 can be coupled to the system bus 104. The at least one memory unit 126 can include by way of example, and not by way of limitation, a random access memory (RAM) unit.

The at least one network interface module 108 can include hardware, software, or a combination of both configured to facilitate exchange of data to and from a network 128. The at least one network interface module 108 can be configured to support at least one communications protocol. The at least one network interface module 108 can be coupled to the system bus 104. The network 128 can be any type of network including, but not limited to, a wired or wireless network, a public or private network, a personal area network (PAN), a local area network (LAN), a wide local area network (WLAN), and the Internet.

The at least one input module 110 can include by way of example, and not by way of limitation, a user interface, a graphical user interface, a keyboard, a pointing device (e.g., a mouse), a touchpad, a touchscreen, a switch, a button, a voice processor, the like, or any combination of the foregoing. The at least one input module 110 can be coupled to the system bus 104.

The at least one output module 112 can include by way of example, and not by way of limitation, a printer, a display, an audio output device, a graphic output device, a video output device, another visual indicator, the like, or any combination of the foregoing. The at least one output module 112 can be coupled to the system bus 104. In an aspect, the at least one output module 112 can include at least one display 130. The at least one display 130 can include, but is not limited to, a cathode ray tube, a liquid crystal display, a plasma display, a light-emitting diode display, an organic light-emitting diode display, the like, or any combination of the foregoing. The system 100 can further include at least one display controller 132 configured to receive control information from the at least one block-based computer processing unit 102 via the system bus 104. The at least one display controller 132 can be configured to send information to the at least one display 130 via at least one video processor 134. The at least one video processor 134 can be configured to receive the information from the at least one display controller 132, to process the information so that the information has a form that is compatible with the at least one display 130, and to send the processed information to the at least one display 130.

The system 100 can be incorporated, by way of example, and not by way of limitation, into a set top box, an entertainment unit, a navigation device, a communication device, a fixed location data unit, a mobile location data unit, a mobile phone, a cellular phone, a smartphone, a computer, a desktop computer, a portable computer, a laptop computer, a tablet computer, a personal digital assistant (PDA), a monitor, a computer monitor, a television, a tuner, a radio, a satellite radio, a music player, a digital music player, a portable music player, a video player, a digital video player, a portable digital video player, a digital video disc (DVD) player, the like, or any combination of the foregoing.

Figure 2:
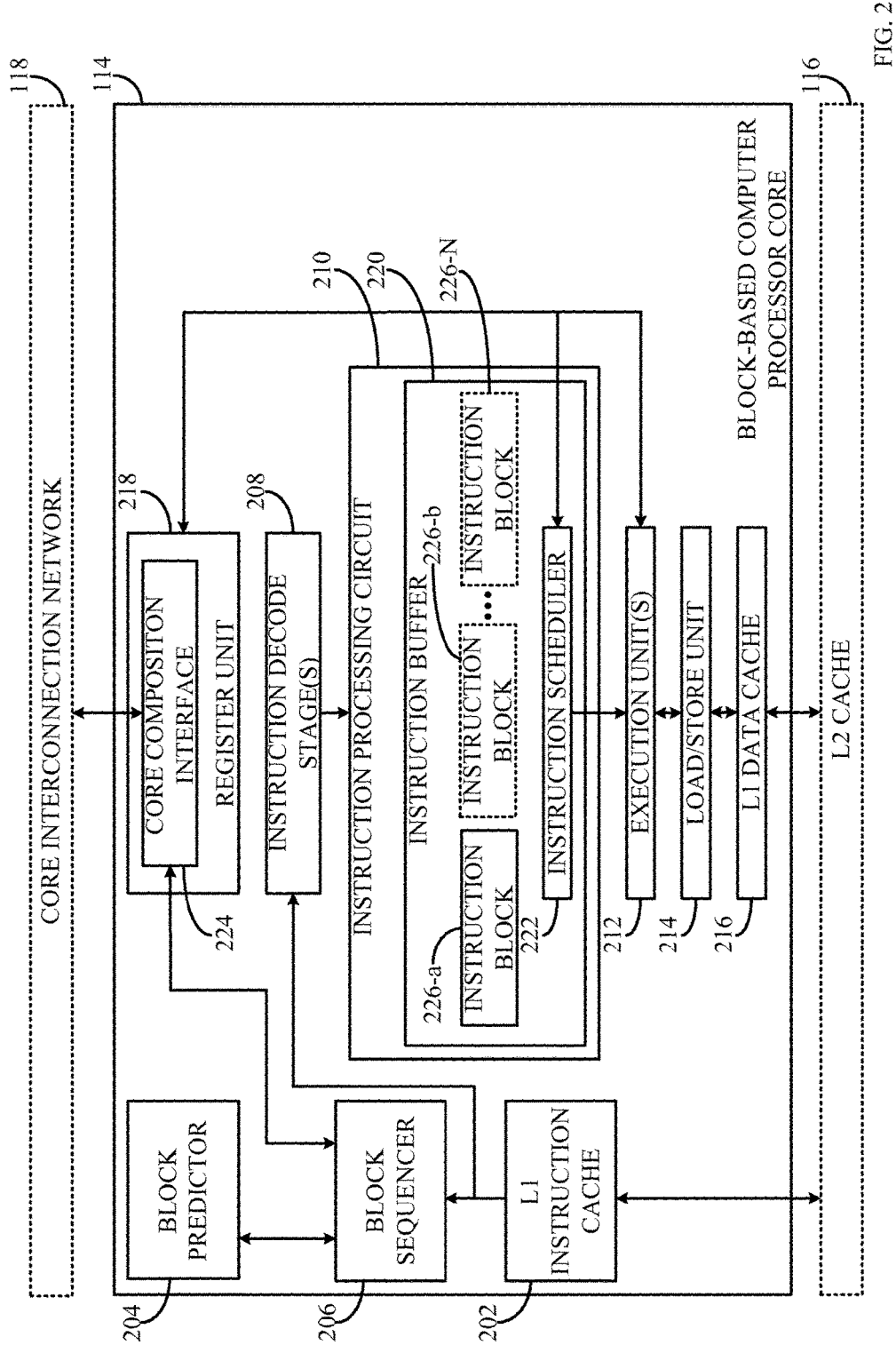
FIG. 2 is a block diagram illustrating an example of a block-based computer processor core.

FIG. 2 is a block diagram illustrating an example of the block-based computer processor core 114. The block-based computer processor core 114 can be configured to be coupled to the L2 cache 116. The block-based computer processor core 114 can be configured to access the L2 cache 116 to receive at least one block of instructions to be executed, to store a result of an execution of the at least one block of instructions, or both. Optionally, the block-based computer processor core 114 can be configured to be coupled to the core interconnection network 118. In an aspect in which the block-based computer processing unit 102 includes multiple block-based computer processor cores 114, the core interconnection network 118 can be used to facilitate communication among the block-based computer processor cores 114.

The block-based computer processor core 114 can include any of several known digital logic elements, semiconductor circuits, processing cores, other elements, the like, or any combination thereof. Aspects described herein are not restricted to any particular arrangement of the elements and the disclosed techniques can be realized in various structures or layouts on semiconductor dies or packages.

The block-based computer processor core 114 can include by way of example, and not by way of limitation, a level-1 (L1) instruction cache 202, a block predictor 204, a block sequencer 206, at least one instruction decode stage 208, an instruction processing circuit 210, at least one execution unit 212, a load/store unit 214, a level-1 (L1) data cache 216, and a register unit 218. By way of example, and not by way of limitation, the instruction processing circuit 210 can include an instruction buffer 220 and an instruction scheduler 222. In an aspect in which the block-based computer processing unit 102 includes multiple block-based computer processor cores 114, the block-based computer processor core 114 can include a core composition interface 224. By way of example, and not by way of limitation, the core composition interface 224 can be included in the register unit 218.

The L1 instruction cache 202 can be configured to receive blocks of instructions 226 from the L2 cache 116. The L1 instruction cache 202 can be configured to transmit information to the L2 cache 116. The L1 instruction cache 202 can be configured to store the blocks of instructions 226. The L1 instruction cache 202 can be configured to transmit information about the blocks of instructions 226 to the block sequencer 206. The L1 instruction cache 202 can be configured to transmit the blocks of instructions 226 to the at least one instruction decode stage 208. For example, the L1 instruction cache 202 can be configured to receive blocks of instructions 226-a through 226-N from the L2 cache 116.

The block predictor 204 can be configured to predict a next block of instructions 226 to be executed following execution of a current block of instructions 226. In an aspect, the block predictor 204 can be configured to predict an execution path in a manner similar to that of a branch predictor in a conventional OOO computer processing unit. In an aspect, the block predictor 204 can be configured to predict a next block of instructions 226 to be executed following execution of a current block of instructions 226 based upon the execution path determined by predicates produced by executing dataflow test instructions to convert branching instructions into a directed acyclic graph (DAG), a history of previously executed blocks of instructions 226, or both. The block predictor 204 can be configured to receive the information about the blocks of instructions 226 from the block sequencer 206. The block predictor 204 can be configured to transmit information about a prediction to the block sequencer 206. In response to an execution, in a current block of instructions 226, of a branch instruction to an actual next block of instructions 226, the actual next block of instructions 226 can be compared to the predicted next block of instructions 226.

The block sequencer 206 can be configured to receive the information about the blocks of instructions 226 from the L1 instruction cache 202 and the information about the prediction from the block predictor 204. The block sequencer 206 can be configured to maintain an order for the blocks of instructions 226. The block sequencer 206 can be configured to fetch, at one time, a number of bits of the block of instructions 226. The number of bits can be within a range, inclusively, from one to a maximum number. The maximum number can be, for example, the number of bits in the block header of the block of instructions 226. By way of example, and not be way of limitation, the number of bits in the block header can be 128. Because the number of bits that can be fetched by the block sequencer 206 can be greater than a number of bits in a single instruction of the block of instructions 226, the block sequencer 206 can be configured to fetch instructions in the block of instructions 226 in fetch bundles of instructions. A fetch bundle of instructions can be a subset of instructions of a block of instructions 226. By way of example, and not by way of limitation, the number of bits in a single instruction of the block of instructions 226 can be 32. By way of example, and not by way of limitation, because the block sequencer 206 can be configured to fetch, at one time, a maximum number of bits, which can be 128, and because the number of bits in a single instruction of the block of instructions 226 can be 32, the block sequencer 206 can be configured to fetch, at one time, a fetch bundle of instructions of the block of instructions 226 in which a number of instructions in the fetch bundle of instructions can be within a range, inclusively, from one to four. (By way of example, and not by way of limitation, if the number of instructions in the block of instructions 226 is 32, then the block of instructions 226 can include eight fetch bundles of instructions.) In an aspect in which the block-based computer processing unit 102 includes multiple block-based computer processor cores 114, the block sequencer 206 can be configured to exchange information with the core composition interface 224.

The at least one instruction decode stage 208 can be configured to receive the blocks of instructions 226 from the L1 instruction cache 202. The at least one instruction decode stage 208 can be configured to decode instructions in the blocks of instructions 226. For example, the at least one instruction decode stage 208 can be configured to decode the instructions in the blocks of instructions 226-a through 226-N. The at least one instruction decode stage 208 can be configured to transmit the instructions in the blocks of instructions 226 to the instruction processing circuit 210.

The instruction buffer 220 of the instruction processing circuit 210 can be configured to receive the blocks of instructions 226 from the at least one instruction decode stage 208. The instruction buffer 220 can be configured to store the instructions of the blocks of instructions 226 in anticipation of executing the instructions.

The instruction scheduler 222 of the instruction processing circuit 210 can be configured to transmit instructions, of the blocks of instructions 226 that have commenced the process of executing instructions, to the at least one execution unit 212. The number of blocks of instructions 226 that can be executed concurrently by a single block-based computer processor core 114 can within a range, inclusively, from one to a maximum number. The maximum number can be defined with respect to the microarchitecture of the computer processor core 114. For example, the maximum number of blocks of instructions 226 that can be executed concurrently can be equal to a number of arrays 304 of reservation stations 306 in the set 302 (see FIG. 3) of the computer processor core 114. By way of example, and not by way of limitation, if the computer processor core 114 has four arrays of reservation stations, then the maximum number of blocks of instructions 226 that can be executed concurrently can be limited to four blocks of instructions 226. By way of example, and not by way of limitation, if the maximum number of blocks of instructions 226 that can be executed concurrently is limited to four blocks of instructions, then the blocks of instructions 226-a, 226-b, 226-c (not illustrated), and 226-d (not illustrated) can be concurrently in a process of executing instructions.

At least one execution unit 212 can be configured to receive an instruction from the instruction scheduler 222. The execution unit 212 can be configured to receive an operand from at least one of: (1) a result of another instruction via the instruction scheduler 222, (2) a register of the register unit 218, or (3) the at least one memory unit 126 via the load/store unit 214. The execution unit 212 can be configured to execute the instruction received from the instruction scheduler 222 in response to all of the operands needed by the instruction having been received by the execution unit 212. The execution unit 212 can be configured to transmit a result of the instruction to at least one of: (1) another instruction via the instruction scheduler 222, (2) a register of the register unit 218, or (3) the at least one memory unit 126 via the load/store unit 214. By way of example, and not by way of limitation, the execution unit 212 can include at least one of an arithmetic logic unit (ALU) or a floating-point unit (FPU).

The load/store unit 214 can be configured to receive data from the at least one execution unit 212. The load/store unit 214 can be configured to receive data from the at least one memory unit 126 via the L2 cache 116 and the L1 data cache 216. The load/store unit 214 can be configured to transmit data to the at least one execution unit 212. The load/store unit 214 can be configured to transmit data to the at least one memory unit 126 via the L1 data cache 216 and the L2 cache 116.

The L1 data cache 216 can be configured to receive data from the load/store unit 214. The L1 data cache 216 can be configured to receive data from the L2 cache 116. The L1 data cache 216 can be configured to store data. The L1 data cache 216 can be configured to transmit data to the load/store unit 214. The L1 data cache 216 can be configured to transmit data to the L2 cache 116.

The register unit 218 can include a physical register file. The register unit 218 can be configured to receive data from the at least one execution unit 212. The register unit 218 can be configured to store data. The register unit 218 can be configured to transmit data to the at least one execution unit 212. By way of example, and not by way of limitation, the register unit 218 can include a random access memory (RAM) unit, such as a fast static RAM unit that can have at least one dedicated read port and at least one dedicated write port. By way of example, and not by way of limitation, the register unit 218 can include 128 physical registers.

In an aspect in which the block-based computer processing unit 102 includes multiple block-based computer processor cores 114, the core composition interface 224 can be configured to exchange information with the block sequencer and to exchange information with the core interconnection network 118 to facilitate communication among the block-based computer processor cores 114.

Figure 3:
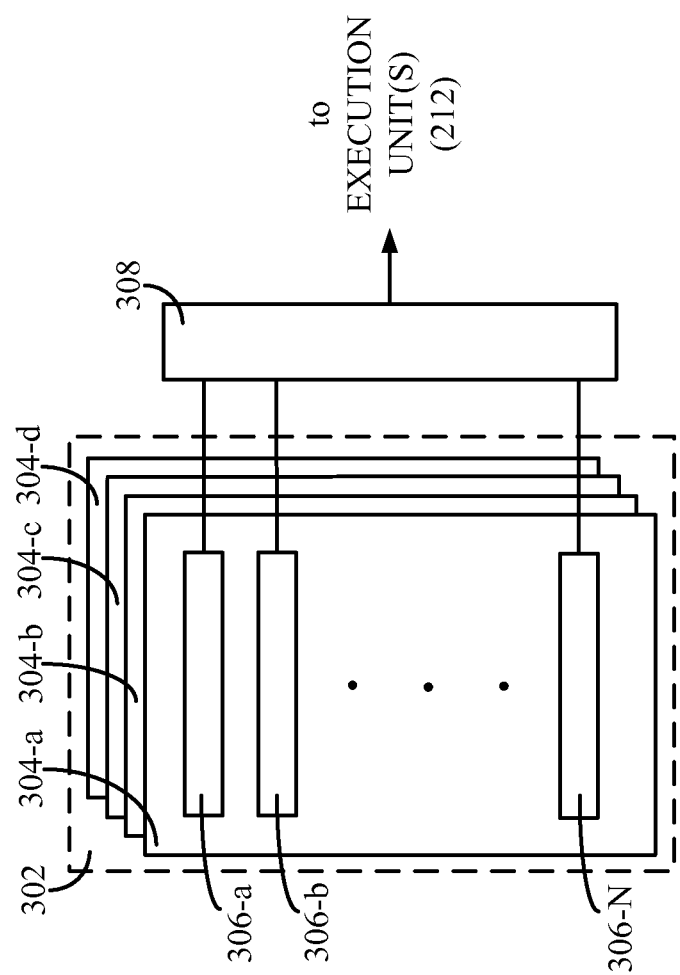
FIG. 3 is a block diagram illustrating an example of a set of arrays of reservation stations.

FIG. 3 is a block diagram illustrating an example of a set 302 of the arrays 304 of the reservation stations 306. For example, the set 302 of arrays 304 of reservation stations 306 can be included in the instruction scheduler 222 (see FIG. 2). The set 302 of the arrays 304 of the reservation stations 306 can include at least one array 304. By way of example, and not by way of limitation, arrays 304-a, 304-b, 304-c, and 304-d are illustrated in FIG. 3. Each array 304 can include at least one reservation station 306. For example, N reservation stations 306-a, 306-b, . . . , 306-N are illustrated in the array 304-a in FIG. 3. By way of example, and not by way of limitation, N can be 32. Each reservation station 306 can be coupled to a priority encoder 308 (or an arbiter). The priority encoder 308 (or the arbiter) can be configured to coordinate routing each instruction stored in a reservation station 306 that has received all of the operands needed by the instruction to the at least one execution unit 212 (see FIG. 2). Alternatively, rather than having each reservation station 306 coupled to the priority encoder 308 (or the arbiter), each reservation station 306 can be coupled to a corresponding one of the at least one execution unit 212.

A block-based instruction set architecture can define a set of architectural registers to be used during execution of a computer program. Having the set of architectural registers defined by the instruction set architecture can allow the computer program to be compiled to execute instructions with reference to the architectural registers rather than with reference to physical registers of the register unit 218 (see FIG. 2). Control circuitry associated with the register unit 218 can maintain at least one register rename map to map each architectural register referenced by an instruction of the computer program to a corresponding physical register of the register unit 218. However, as described above, in a block-based instruction set architecture: (1) the instructions in the computer program can be assigned to blocks, (2) a number of the blocks of instructions 226 (see FIG. 2) can be executed concurrently by a single block-based computer processor core 114 (see FIGS. 1 and 2), and (3) the block-based computer processing unit 102 (see FIG. 1) can be configured to cause the at least one block-based computer processor core 114 to operate in conjunction with at least one other of the at least one block-based computer processor core 114 as a core composition. The distribution of the instructions across the blocks of instructions 226 and the distribution of the blocks of instructions 226 among the block-based computer processor cores 114 can complicate efforts to map architectural registers to physical registers at least because the architectural registers are defined for all of the instructions of the computer program while the physical registers reside within the register unit 218 of each of the block-based computer processor cores 114.

Moreover, a block-based instruction set architecture can be configured so that a consuming instruction, of a first block of instructions 226, receives an operand by reading from an architectural register to which a producing instruction, of a second block of instructions 226, has written a result of the producing instruction. Similarly, a producing instruction, of the first block of instructions 226, transmits a result of the producing instruction by writing to an architectural register from which a consuming instruction, of a third block of instructions 226, can read the result of the producing instruction as an operand for the consuming instruction. In other words, a block-based instruction set architecture can be configured to use the architectural registers to communicate operands and results between instructions of different blocks of instructions 226.

FIGS. 4 through 9 are diagrams illustrating an example of blocks of instructions 226 executing in a sequence of time periods on the block-based computer processor core 114. By way of example, and not by way of limitation, the block-based computer processor core 114 illustrated in FIGS. 4 through 9 can include the set 302 of the arrays 304 of the reservation stations 306 illustrated in FIG. 3: the arrays 304-*a*, 304-*b*, 304-*c*, and 304-*d*. As described above, the number of the blocks of instructions 226 (see FIG. 2), among the blocks of instructions 226 included in the computer program, that can be executed concurrently by a single block-based computer processor core 114 can be equal to the number of the arrays 304 of the reservation stations 306 of the computer processor core 114. Accordingly, the block-based computer processor core 114 illustrated in FIGS. 4 through 9 can execute four blocks of instructions 226 concurrently. If the number of the blocks of instructions 226 in the computer program is greater than the number of the blocks of instructions 226 that can be executed concurrently (by a single block-based computer processor core 114 or by several block-based computer processor cores 114 if the block-based computer processing unit 102 (see FIG. 1) has caused several of the block-based computer processor cores 114 to operate as a core composition), then the blocks of instructions 226 in the computer program can be executed in phases of execution.

Figure 4:
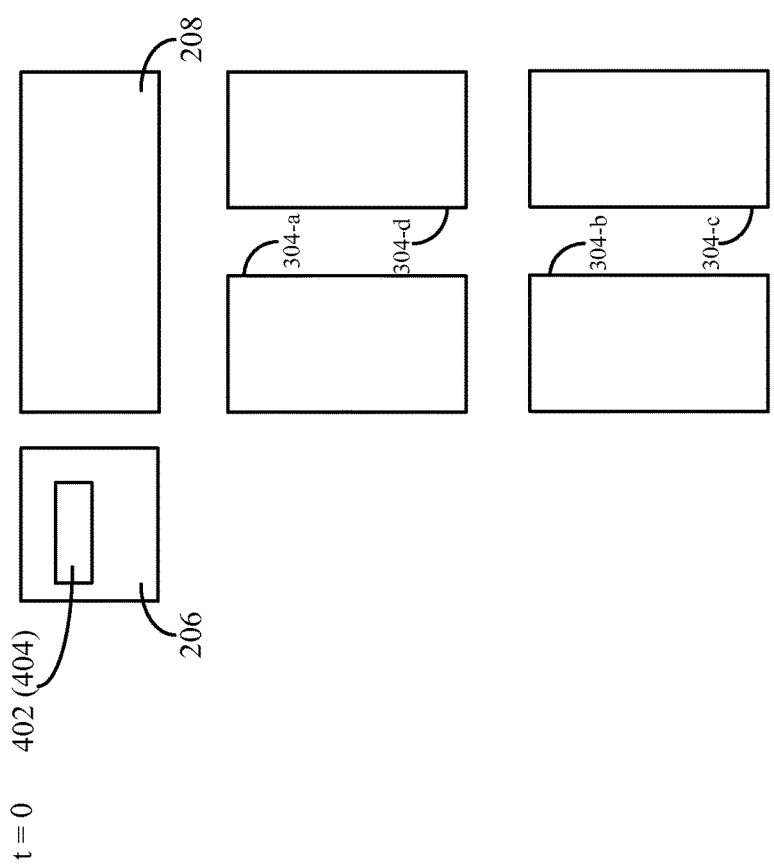
FIGS. 4 through 9 are diagrams illustrating an example of blocks of instructions executing in a sequence of time periods on the block-based computer processor core illustrated in FIG. 1.

FIG. 4 illustrates the block-based computer processor core 114 at a time t=0. At a time t=0, the block sequencer 206 can fetch a block header 402 of a first block of instructions 404, among the blocks of instructions 226 (see FIG. 2) included in the computer program. The block predictor 204 (see FIG. 2) can use information in the block header 402 to predict which block of instructions 226, among the blocks of instructions 226 included in the computer program, includes at least one effectual instruction that is likely to be executed based upon a result of a causal instruction included in the first block of instructions 404. For example, the block predictor 204 can predict that a second block of instructions 502 (see FIG. 5) includes at least one effectual instruction that is likely to be executed based upon a result of a causal instruction included in the first block of instructions 404.

Figure 5:
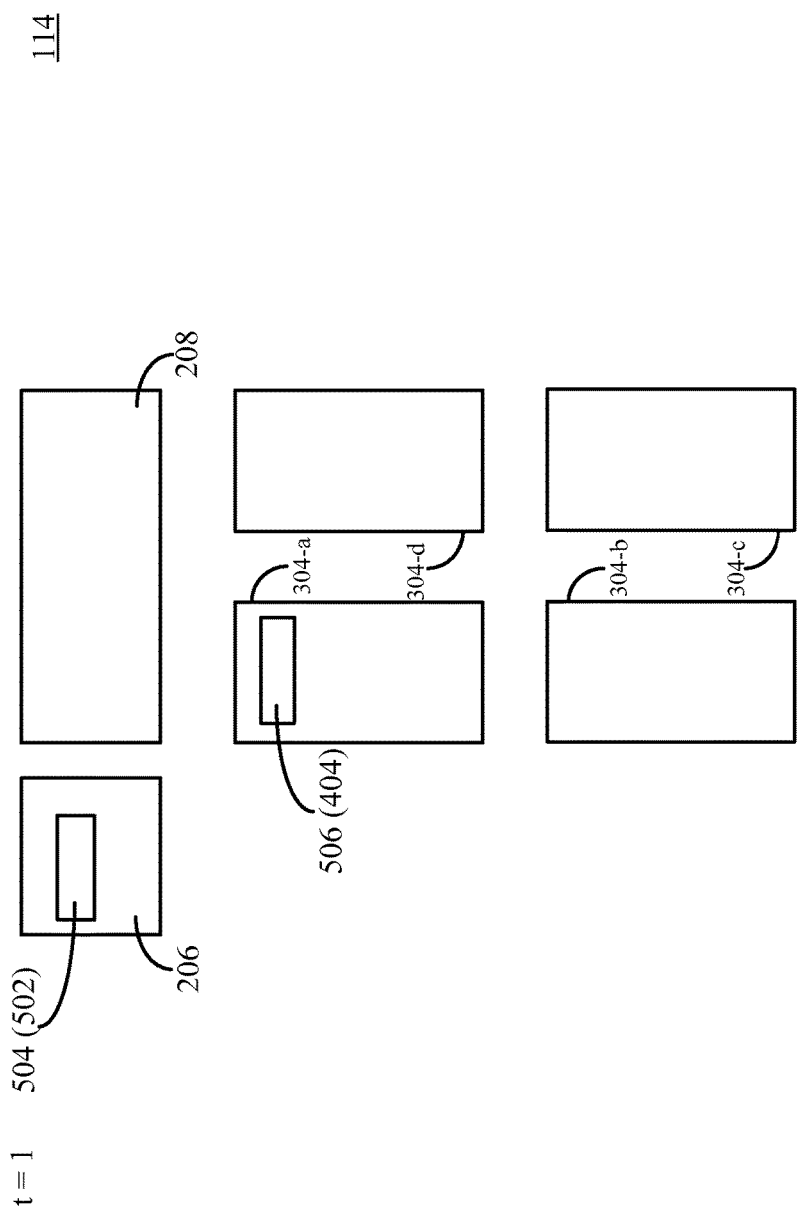

FIG. 5 illustrates the block-based computer processor core 114 at a time t=1. At time t=1, the block sequencer 206 can fetch a block header 504 of the second block of instructions 502. The block predictor 204 (see FIG. 2) can use information in the block header 504 to predict which block of instructions 226, among the blocks of instructions 226 (see FIG. 2) included in the computer program, includes at least one effectual instruction that is likely to be executed based upon a result of a causal instruction included in the second block of instructions 502. For example, the block predictor 204 can predict that a third block of instructions 602 (see FIG. 6) includes at least one effectual instruction that is likely to be executed based upon a result of a causal instruction included in the second block of instructions 502. The at least one instruction decode stage 208 can fetch and decode a first bundle of instructions 506 of the first block of instructions 404. Because one of the arrays 304 is available to support execution of the first block of instructions 404, the first bundle of instructions 506 of the first block of instructions 404 can be conveyed to one of the available arrays 304, for example, to the array 304-*a* to commence being executed.

Figure 6:
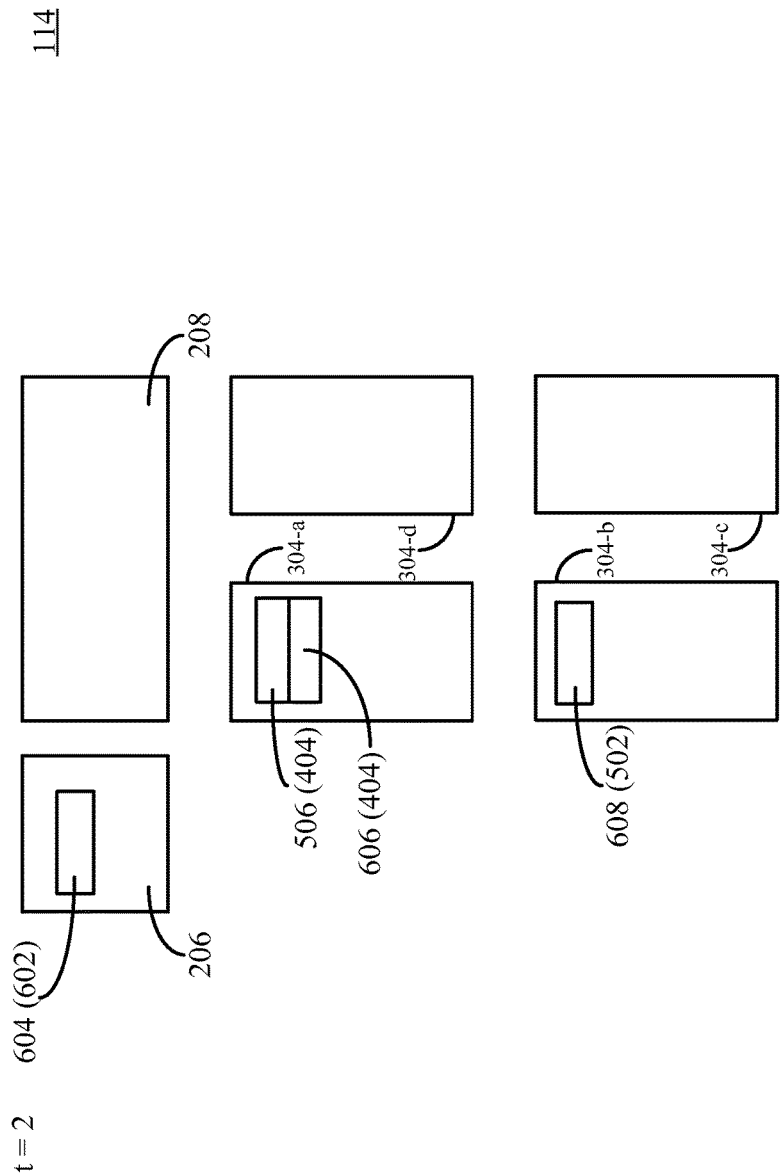

FIG. 6 illustrates the block-based computer processor core 114 at a time t=2. At time t=2, the block sequencer 206 can fetch a block header 604 of the third block of instructions 602. The block predictor 204 (see FIG. 2) can use information in the block header 604 to predict which block of instructions 226, among the blocks of instructions 226 (see FIG. 2) included in the computer program, includes at least one effectual instruction that is likely to be executed based upon a result of a causal instruction included in the third block of instructions 602. For example, the block predictor 204 can predict that a fourth block of instructions 702 (see FIG. 7) includes at least one effectual instruction that is likely to be executed based upon a result of a causal instruction included in the third block of instructions 602. The at least one instruction decode stage 208 can fetch and decode a second fetch bundle of instructions 606 of the first block of instructions 404, which can be conveyed to the array 304-*a* to commence being executed. The at least one instruction decode stage 208 can also fetch and decode a first fetch bundle of instructions 608 of the second block of instructions 502. Because one of the arrays 304 is available to support execution of the second block of instructions 502, the first fetch bundle of instructions 608 of the second block of instructions 502 can be conveyed to one of the available arrays 304, for example, to the array 304-*b* to commence being executed.

Figure 7:
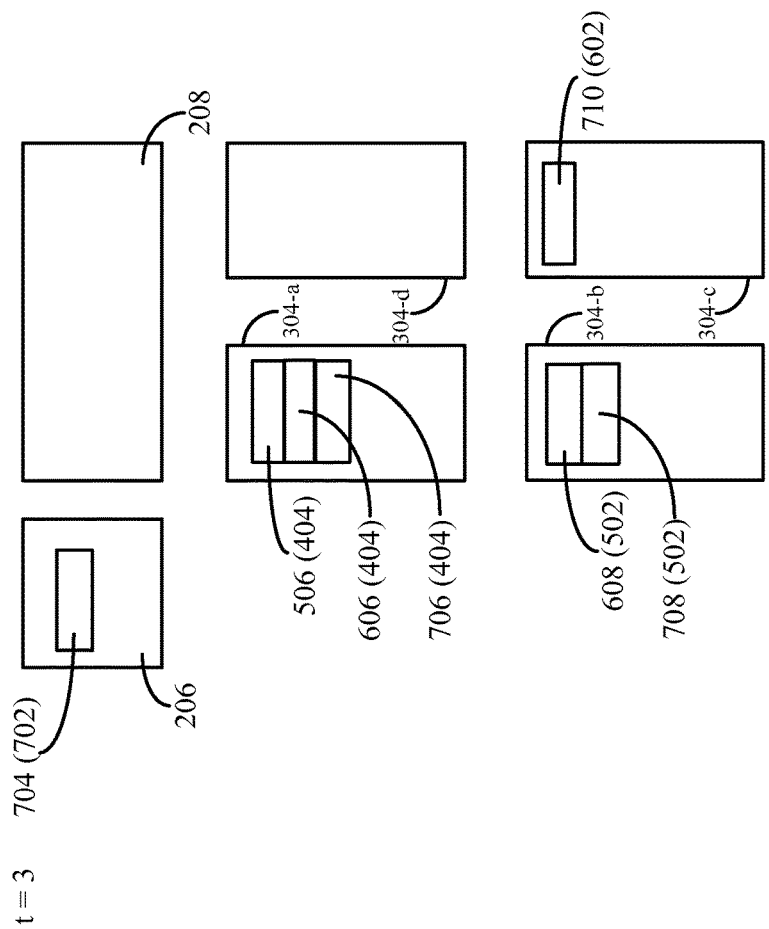

FIG. 7 illustrates the block-based computer processor core 114 at a time t=3. At time t=3, the block sequencer 206 can fetch a block header 704 of the fourth block of instructions 702. The block predictor 204 (see FIG. 2) can use information in the block header 704 to predict which block of instructions 226, among the blocks of instructions 226 (see FIG. 2) included in the computer program, includes at least one effectual instruction that is likely to be executed based upon a result of a causal instruction included in the fourth block of instructions 702. For example, the block predictor 204 can predict that a fifth block of instructions 802 (see FIG. 8) includes at least one effectual instruction that is likely to be executed based upon a result of a causal instruction included in the fourth block of instructions 702. The at least one instruction decode stage 208 can fetch and decode a third fetch bundle of instructions 706 of the first block of instructions 404, which can be conveyed to the array 304-*a* to commence being executed. The at least one instruction decode stage 208 can also fetch and decode a second fetch bundle of instructions 708 of the second block of instructions 502, which can be conveyed to the array 304-*b* to commence being executed. The at least one instruction decode stage 208 can also fetch and decode a first fetch bundle of instructions 710 of the third block of instructions 602. Because one of the arrays 304 is available to support execution of the third block of instructions 602, the block sequencer 206 can also fetch a first fetch bundle of instructions 710 of the third block of instructions 602, the first fetch bundle of instructions 710 of the third block of instructions 602 can be conveyed to one of the available arrays 304, for example, to the array 304-*c* to commence being executed.

Figure 8:
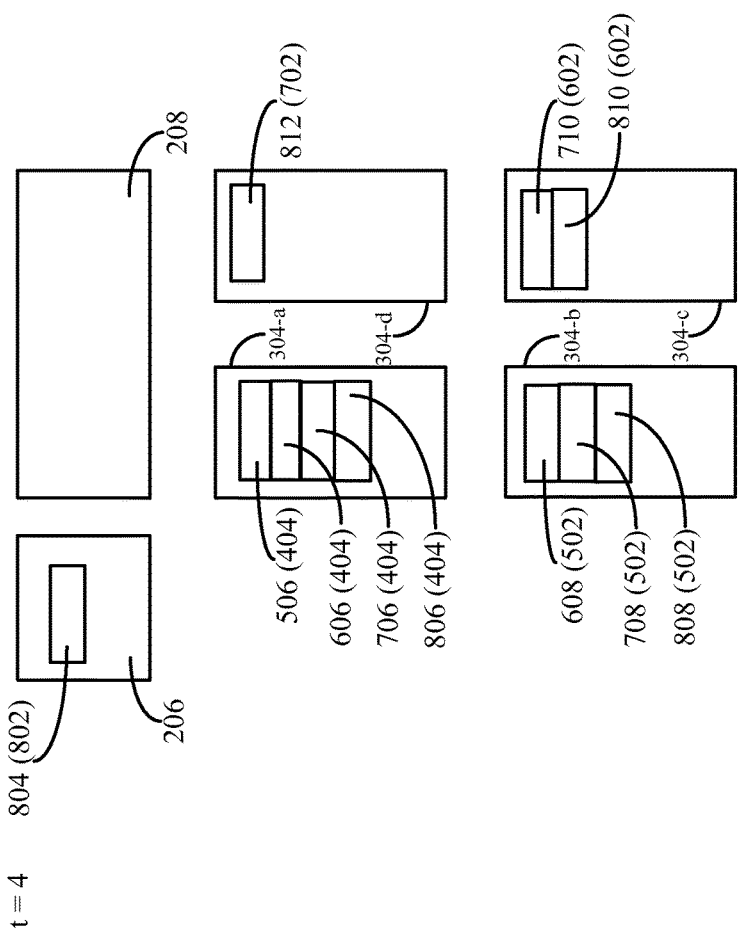

FIG. 8 illustrates the block-based computer processor core 114 at a time t=4. At time t=4, the block sequencer 206 can fetch a block header 804 of the fifth block of instructions 802. The block predictor 204 (see FIG. 2) can use information in the block header 804 to predict which block of instructions 226, among the blocks of instructions 226 (see FIG. 2) included in the computer program, includes at least one effectual instruction that is likely to be executed based upon a result of a causal instruction included in the fifth block of instructions 802. For example, the block predictor 204 can predict that a sixth block of instructions 902 (see FIG. 9) includes at least one effectual instruction that is likely to be executed based upon a result of a causal instruction included in the fifth block of instructions 802. The at least one instruction decode stage 208 can fetch and decode a fourth fetch bundle of instructions 806 of the first block of instructions 404, which can be conveyed to the array 304-*a* to commence being executed. The at least one instruction decode stage 208 can also fetch and decode a third fetch bundle of instructions 808 of the second block of instructions 502, which can be conveyed to the array 304-*b* to commence being executed. The at least one instruction decode stage 208 can also fetch and decode a second fetch bundle of instructions 810 of the third block of instructions 602, which can be conveyed to the array 304-*c* to commence being executed. The at least one instruction decode stage 208 can also fetch and decode a first fetch bundle of instructions 812 of the fourth block of instructions 702. Because one of the arrays 304 is available to support execution of the fourth block of instructions 702, the first fetch bundle of instructions 812 of the fourth block of instructions 702 can be conveyed to the available array 304-*d* to commence being executed.

Figure 9:
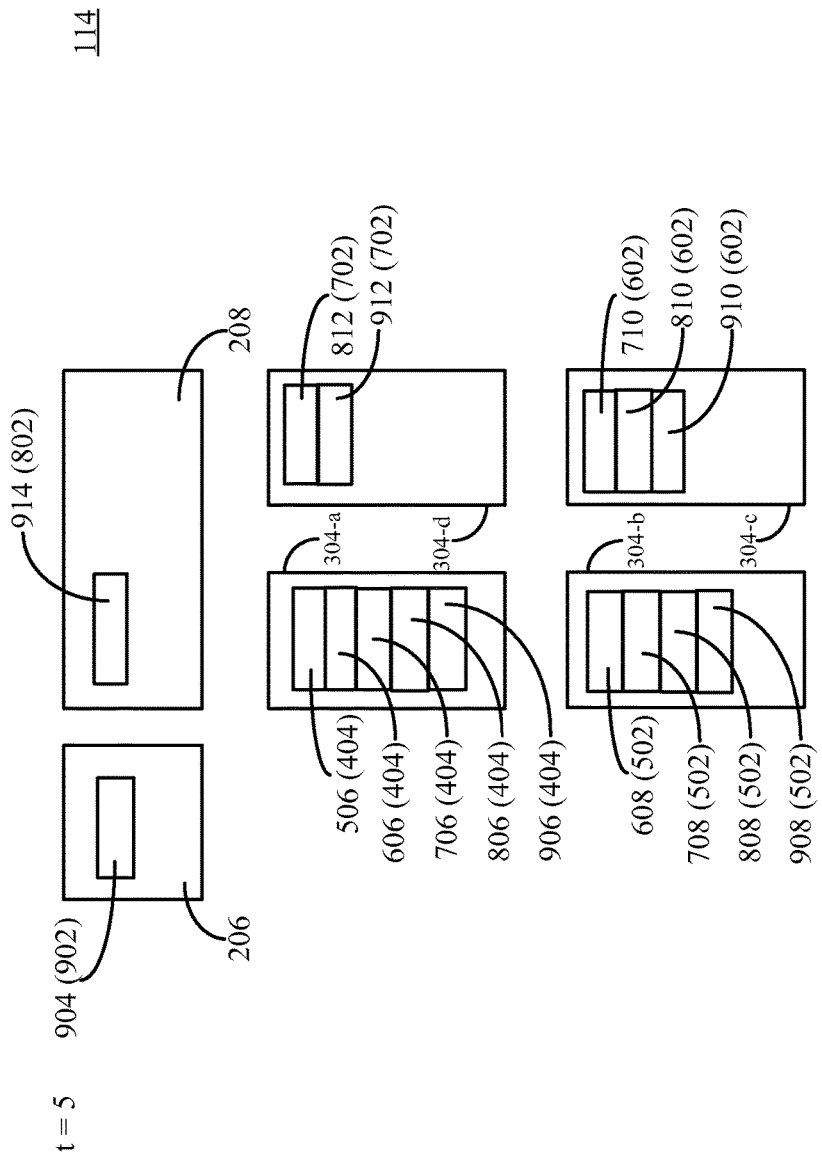

FIG. 9 illustrates the block-based computer processor core 114 at a time t=5. At time t=5, the block sequencer 206 can fetch a block header 904 of the sixth block of instructions 902. The block predictor 204 (see FIG. 2) can use information in the block header 904 to predict which block of instructions 226, among the blocks of instructions 226 (see FIG. 2) included in the computer program, includes at least one effectual instruction that is likely to be executed based upon a result of a causal instruction included in the sixth block of instructions 902. For example, the block predictor 204 can predict that a seventh block of instructions (not illustrated) includes at least one effectual instruction that is likely to be executed based upon a result of a causal instruction included in the sixth block of instructions 902. The at least one instruction decode stage 208 can fetch and decode a fifth fetch bundle of instructions 906 of the first block of instructions 404, which can be conveyed to the array 304-*a* to commence being executed. The at least one instruction decode stage 208 can also fetch and decode a fourth fetch bundle of instructions 908 of the second block of instructions 502, which can be conveyed to the array 304-*b* to commence being executed. The at least one instruction decode stage 208 can also fetch and decode a third fetch bundle of instructions 910 of the third block of instructions 602, which can be conveyed to the array 304-*c* to commence being executed. The at least one instruction decode stage 208 can also fetch and decode a second fetch bundle of instructions 912 of the fourth block of instructions 702, which can be conveyed to the array 304-*d* to commence being executed. The at least one instruction decode stage 208 can also fetch and decode a first fetch bundle of instructions 914 of the fifth block of instructions 802. However, because none of the arrays 304 is available to support execution of the fifth block of instructions 802, the first fetch bundle of instructions 914 of the fifth block of instructions 802 can be stored in the at least one instruction decode stage 208 until one of the first block of instructions 404, the second block of instructions 502, the third block of instructions 602, or the fourth block of instructions 702 can complete execution of its instructions and can commit to its authentic results so that its corresponding one of the arrays 304 can be available to support execution of the fifth block of instructions 802.

In this manner, as described above, the blocks of instructions 226 in the computer program can be executed in phases of execution. A first phase of execution can include execution of the first block of instructions 404 conveyed to the array 304-*a*, execution of the second block of instructions 502 conveyed to the array 304-*b*, execution of the third block of instructions 602 conveyed to the array 304-*c*, and execution by the fourth block of instructions 702 conveyed to the array 304-*d*. A second phase of execution can include execution of the fifth block of instructions 802 after being conveyed to an available one of the arrays 304, execution of the sixth block of instructions 902 after being conveyed to an available one of the arrays 304, execution of a seventh block of instructions (not illustrated) after being conveyed to an available one of the arrays 304, and execution of an eighth block of instructions (not illustrated) after being conveyed to an available one of the arrays 304. Additional phases of execution can be executed in the same manner until all of the blocks of instructions 226 of the computer program have been executed. Moreover, a phase of execution is related to a corresponding one of the arrays 304 such that it can be the case that the block-based computer processor core 114 can be executing two phases of execution concurrently (e.g., executing the second block of instructions 502 conveyed to the array 304-*b* in the first phase of execution, executing the third block of instructions 602 conveyed to the array 304-*c* in the first phase of execution, executing the fourth block of instructions 702 conveyed to the array 304-*d* in the first phase of execution, and executing the fifth block of instructions 902 conveyed to the array 304-*a* in the second phase of execution).

As described above, the distribution of the instructions across the blocks of instructions 226 (see FIG. 2) can complicate efforts to map architectural registers to physical registers that reside within the register unit 218 of the block-based computer processor core 114. In an aspect, block-based computer processor core 114 may at least produce, store, and/or maintain at least one intra-core register rename map.

Figure 10:
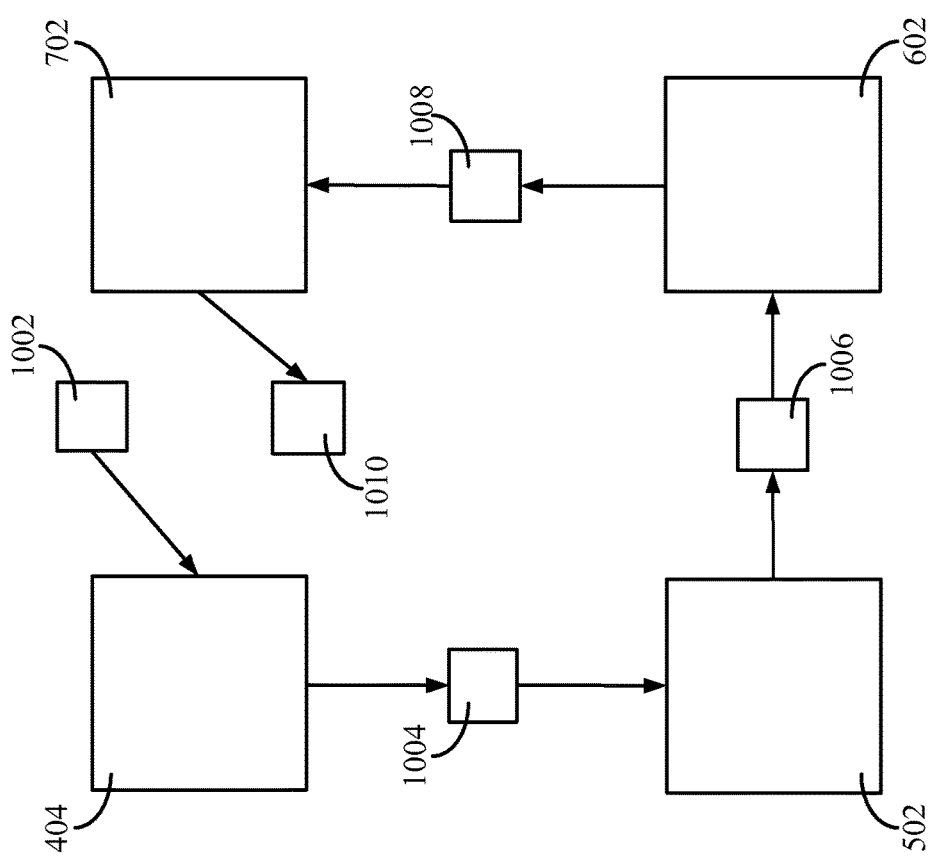
FIG. 10 is a diagram illustrating an example of blocks of instructions and associated intra-core register rename maps.

FIG. 10 is a diagram illustrating an example of blocks of instructions 226 (see FIG. 2) and associated intra-core register rename maps. The diagram includes the first block of instructions 404 (conveyed to the array 304-a), the second block of instructions 502 (conveyed to the array 304-b), the third block of instructions 602 (conveyed to the array 304-c), and the fourth block of instructions 702 (conveyed to the array 304-d). The diagram also includes a first intra-core register rename map 1002, a second intra-core register rename map 1004, a third intra-core register rename map 1006, a fourth intra-core register rename map 1008, and a fifth intra-core register rename map 1010.

Figure 11:
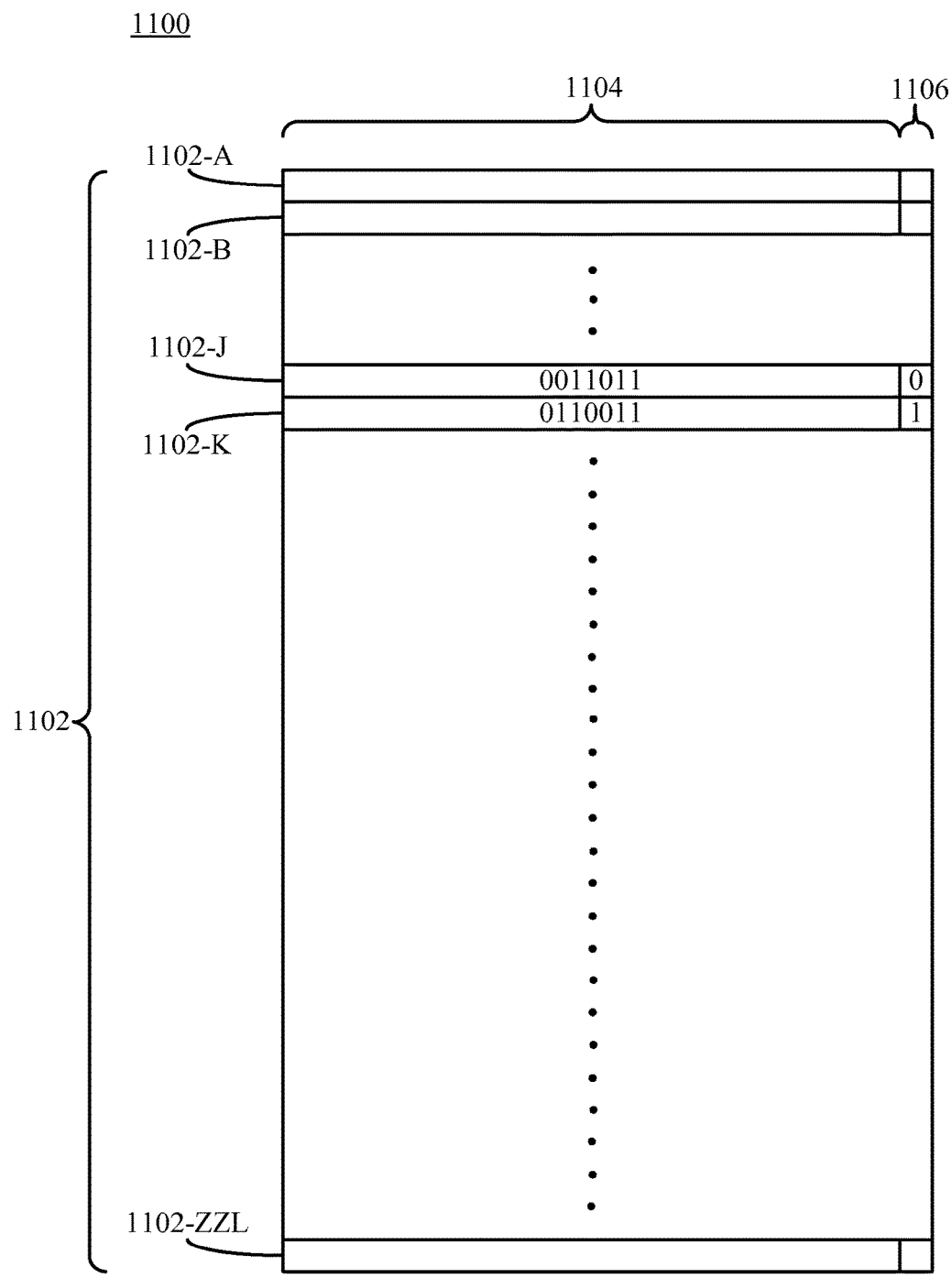
FIG. 11 is a diagram illustrating an example of an intra-core register rename map.

FIG. 11 is a diagram illustrating an example of an intra-core register rename map 1100. The intra-core register rename map 1100 can include a set of records 1102 that corresponds to a set of architectural registers defined by the block-based instruction set architecture. Each record of the set of records 1102 can correspond to an architectural register. The intra-core register rename map 1100 can be indexed by a reference to an architectural register. By way of example, and not by way of limitation, if the block-based instruction set architecture defines a set of architectural registers that includes 64 architectural registers, then the intra-core register rename map 1100 can include 64 records. In an aspect, the intra-core register rename map 1100 can be stored in the register unit 218 (see FIG. 2).

Each record of the set of records 1102 can include a first field 1104 to store an identification of a physical register of the register unit 218 that has been mapped to the corresponding architectural register. The identification of the physical register can be a physical register number. The physical register number can be represented in binary form using $\log_2 M$ number of bits in which M can be the number of physical registers of the register unit 218. By way of example, and not by way of limitation, if the number of physical registers of the register unit 218 is 128, then the physical register number can be represented in binary form using seven bits. For example, as illustrated in FIG. 11, the intra-core register rename map 1100 can include a record 1102-K that corresponds to the architectural register K. For example, the first field 1104 of the record 1102-K can store the physical register number 0110011, which is the identification of the physical register 51 that has been mapped to the corresponding architectural register K.

Each record of the set of records 1102 can include a second field 1106 to store information that indicates if the corresponding physical register is a location of a most recent write to the corresponding architectural register that has been executed by the block-based computer processor core 114, the most recent write being according to program order. By way of example, and not by way of limitation, a value of the second field 1106 can be set to one if the corresponding physical register is a location of a most recent write to the corresponding architectural register that has been executed by the block-based computer processor core 114, the most recent write being according to program order; otherwise, the value of the second field 1106 can be set to zero. For example, as illustrated in FIG. 11, the value the second field 1106 of the record 1102-J can be set to zero, which can indicate that the corresponding physical register number 0011011 is not a location of a most recent write to the corresponding architectural register J that has been executed by the block-based computer processor core 114, the most recent write being according to program order. For example, as illustrated in FIG. 11, the value the second field 1106 of the record 1102-K can be set to one, which can indicate that the corresponding physical register number 0110011 is a location of a most recent write to the corresponding architectural register K that has been executed by the block-based computer processor core 114, the most recent write being according to program order.

With reference to FIG. 10, each block of instructions 226 (see FIG. 2) can be associated with an input intra-core register rename map and an output intra-core register rename map. For example, the first intra-core register rename map 1002 can be an input intra-core register rename map associated with the first block of instructions 404 and the second intra-core register rename map 1004 can be an output intra-core register rename map associated with the first block of instructions 404. For example, the second intra-core register rename map 1004 can be an input intra-core register rename map associated with the second block of instructions 502 and the third intra-core register rename map 1006 can be an output intra-core register rename map associated with the second block of instructions 502. For example, the third intra-core register rename map 1006 can be an input intra-core register rename map associated with the third block of instructions 602 and the fourth intra-core register rename map 1008 can be an output intra-core register rename map associated with the third block of instructions 602. For example, the fourth intra-core register rename map 1008 can be an input intra-core register rename map associated with the fourth block of instructions 702 and the fifth intra-core register rename map 1010 can be an output intra-core register rename map associated with the fourth block of instructions 702. The input intra-core register rename map can be referenced by instructions of the associated block of instructions 226 and the output intra-core register rename map can reflect expected results of the instructions of the associated block of instructions 226.

Figure 12:
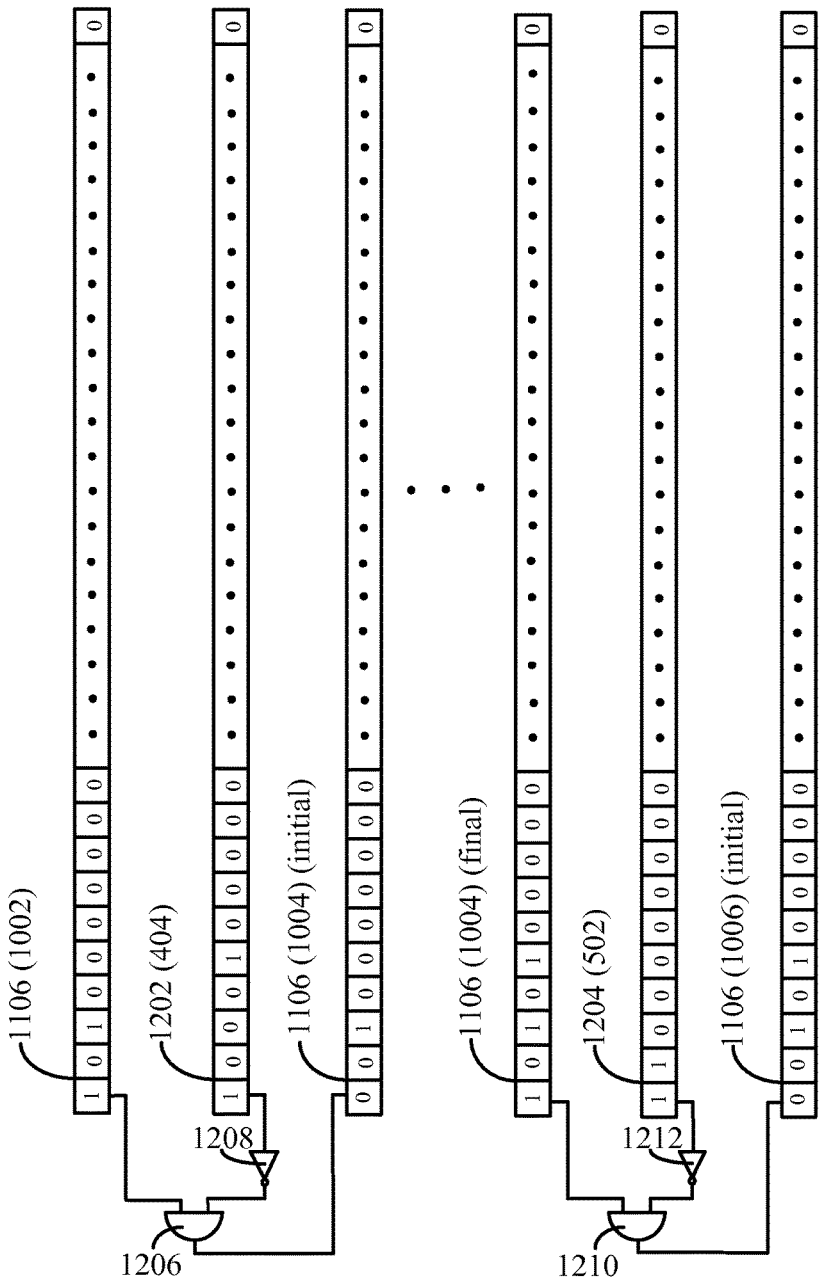
FIG. 12 is a diagram illustrating an example of a portion of a process that produces the intra-core register rename maps illustrated in FIG. 11.

FIG. 12 is a diagram illustrating an example of a portion of a process that produces the intra-core register rename maps 1100. The diagram includes each second field 1106 of the first intra-core register rename map 1002, a write mask 1202 of the block header of the first block of instructions 404, each second field 1106 of the second intra-core register rename map 1004 (initial), each second field 1106 of the second intra-core register rename map 1004 (final), a write mask 1204 of the block header of the second block of instructions 502, and each second field 1106 of the third intra-core register rename map 1006 (initial).

As described above, a block header of a block of instructions 226 (see FIG. 2) can include information to identify which of the architectural registers is an object of a write instruction, of the corresponding block of instructions 226, that is expected to execute on the block-based computer processor core 114. This information can be stored in a write mask of the block header. Each bit in the write mask can correspond to an architectural register. The write mask can be indexed by reference to an architectural register. By way of example, and not by way of limitation, if the block-based instruction set architecture defines a set of architectural registers that includes 64 architectural registers, then the write mask can include 64 bits. By way of example, and not by way of limitation, a value of a bit of the write mask can be set to one if the corresponding architectural register an object of a write instruction, of the corresponding blocks of instructions 226, that is expected to execute on the block-based computer processor core 114; otherwise, the value of the bit of the write mask can be set to zero.

With reference to FIGS. 10 through 12, because the first block of instructions 404 is an initial block of instructions 226 (see FIG. 2) to be executed on the block-based computer processor core 114-c, values of each second field 1106 of the first intra-core register rename map 1002, which is the input intra-core register rename map associated with the first block of instructions 404, can be set to zero.

In an aspect, a value of the second field 1106 of the second intra-core register rename map 1004 (initial), which is the output intra-core register rename map associated with the first block of instructions 404, can initially be set after the block header of the first block of instructions 404 has been fetched, but before instructions of the first block of instructions 404 commence being executed. A value of the second field 1106 of the second intra-core register rename map 1004 (initial) can initially be produced from a value of the second field 1106 of the first intra-core register rename map 1002 and a value of a corresponding bit of the write mask 1202 of the block header of the first block of instructions 404 by performing a bitwise logic operation. A value of a second field 1106 of the first intra-core register rename map 1002 can be a first input to a first AND gate, for example AND gate 1206. A value of a corresponding bit of the write mask 1202 of the block header of the first block of instructions 404 can be an input to a first inverter, for example inverter 1208, and an output of the first inverter (e.g., inverter 1208) can be a second input to the first AND gate (e.g., AND gate 1206). A value of an output of the first AND gate (e.g., AND gate 1206) can be a value of a corresponding second field 1106 of the second intra-core register rename map 1004 (initial). In this manner, if a particular architectural register is an object of a write instruction, of the first block of instructions 404, that is expected to execute on the block-based computer processor core 114 (as indicated by having a value of the corresponding bit of the write mask 1202 of the block header of the first block of instructions 404 set to one), then a value of a corresponding second field 1106 of the second intra-core register rename map 1004 (initial) can initially be set to zero to reflect that although the particular architectural register is an object of a write instruction, of the first block of instructions 404, that is expected to execute on the block-based computer processor core 114, the corresponding physical register is not yet a location of a most recent write to the particular architectural register that has executed on the block-based computer processor core 114, the most recent write being according to program order. During the course of executing instructions of the first block of instructions 404, the value of the corresponding second field 1106 of the second intra-core register rename map 1004 can be changed from zero to one in response to the corresponding physical register becoming a location of a most recent write to the particular architectural register that has executed on the block-based computer processor core 114, the most recent write being according to program order. Thus, the second intra-core register rename map 1004 (final) can reflect that the corresponding physical register is a location of a most recent write to the particular architectural register that has executed on the block-based computer processor core 114, the most recent write being according to program order.

As described above, the second intra-core register rename map 1004 can be the output intra-core register rename map associated with the first block of instructions 404 and can be the input intra-core register rename map associated with the second block of instructions 502. Similarly, in an aspect, a value of the second field 1106 of the third intra-core register rename map 1006 (initial), which is the output intra-core register rename map associated with the second block of instructions 502, can initially be set after the block header of the second block of instructions 502 has been fetched, but before instructions of the second block of instructions 502 commence being executed. A value of the second field 1106 of the third intra-core register rename map 1006 (initial) can initially be produced from a value of the second field 1106 of the second intra-core register rename map 1004 (final) and a value of a corresponding bit of the write mask 1204 of the block header of the second block of instructions 502 by performing a bitwise logic operation. A value of a second field 1106 of the second intra-core register rename map 1004 (final) can be a first input to a second AND gate, for example AND gate 1210. A value of a corresponding bit of the write mask 1204 of the block header of the second block of instructions 502 can be an input to a second inverter, for example inverter 1212, and an output of the second inverter (e.g., inverter 1212) can be a second input to the second AND gate (e.g., AND gate 1210). A value of an output of the second AND gate (e.g., AND gate 1210) can be a value of a corresponding second field 1106 of the third intra-core register rename map 1006 (initial). In this manner, if a particular architectural register is an object of a write instruction, of the second block of instructions 502, that is expected to execute on the block-based computer processor core 114 (as indicated by having a value of the corresponding bit of the write mask 1202 of the block header of the first block of instructions 404 set to one), then a value of a corresponding second field 1106 of the third intra-core register rename map 1006 (initial) can initially be set to zero to reflect that although the particular architectural register is an object of a write instruction, of the second block of instructions 502, that is expected to execute on the block-based computer processor core 114, the corresponding physical register is not yet a location of a most recent write to the particular architectural register that has executed on the block-based computer processor core 114, the most recent write being according to program order. During the course of executing instructions of the second block of instructions 502, the value of the corresponding second field 1106 of the third intra-core register rename map 1006 can be changed from zero to one in response to the corresponding physical register becoming a location of a most recent write to the particular architectural register that has executed on the block-based computer processor core 114, the most recent write being according to program order.

Other intra-core register rename maps 1100 can be produced in the same manner. The fifth intra-core register rename map 1010 can be the input intra-core register rename map associated with the fifth block of instructions 802 (see FIG. 9), which can be stored in in the at least one instruction decode stage 208 until one of the first block of instructions 404, the second block of instructions 502, the third block of instructions 602, or the fourth block of instructions 702 can complete execution of its instructions and can commit to its authentic results so that its corresponding one of the arrays 304 can be available to support execution of the fifth block of instructions 802 in a subsequent phase of execution.

As described above, the computer program can include a sequence of instructions in the source code in which a first instruction (i.e., a causal instruction) is configured to determine a validity of a condition and a second instruction (i.e., an effectual instruction(s)) is configured to be executed based upon a result of the causal instruction (e.g., a branching instruction (e.g., If X is true, Then Y)). Furthermore, sometimes there can be two effectual instructions configured so that a first effectual instruction (i.e., a valid condition instruction) is configured to be executed if the result of the causal instruction indicates that the condition is valid and a second effectual instruction (i.e., an invalid condition instruction) is configured to be executed if the result of the causal instruction indicates that the condition is not valid (e.g., If X is true, Then Y, Else Z). As described above, a write mask of a block header of a block of instructions 226 (see FIG. 2) can include information to identify which of the architectural registers is an object of a write instruction, of the corresponding block of instructions 226, that is expected to execute on the block-based computer processor core 114. A value of a bit of the write mask can be set to one if the corresponding architectural register an object of a write instruction, of the corresponding blocks of instructions 226, that is expected to execute on the block-based computer processor core 114. The corresponding architectural register can be considered to be an object of a write instruction, of the corresponding blocks of instructions 226, that is expected to execute on the block-based computer processor core 114 if the write instruction is a valid condition instruction. In other words, the value of the bit of the write mask can be set to one if the corresponding architectural register an object of a write instruction that is a valid condition instruction for a corresponding causal instruction. However, if in actuality the block-based computer processor core 114 commits to the invalid condition instruction (i.e., not to the write instruction), then in actuality a new value will not be written to the corresponding architectural register. Such a situation can be referred to as an annulment. In response to an annulment, the value that was written to the corresponding architectural register by a write instruction of a previous block of instructions 226 can be maintained.

In an aspect, the block-based computer processor core 114 may at least produce, store, and/or maintain at least one real-time write mask. In an aspect, the at least one real-time write mask can be stored in the register unit 218 (see FIG. 2).

Figure 13:
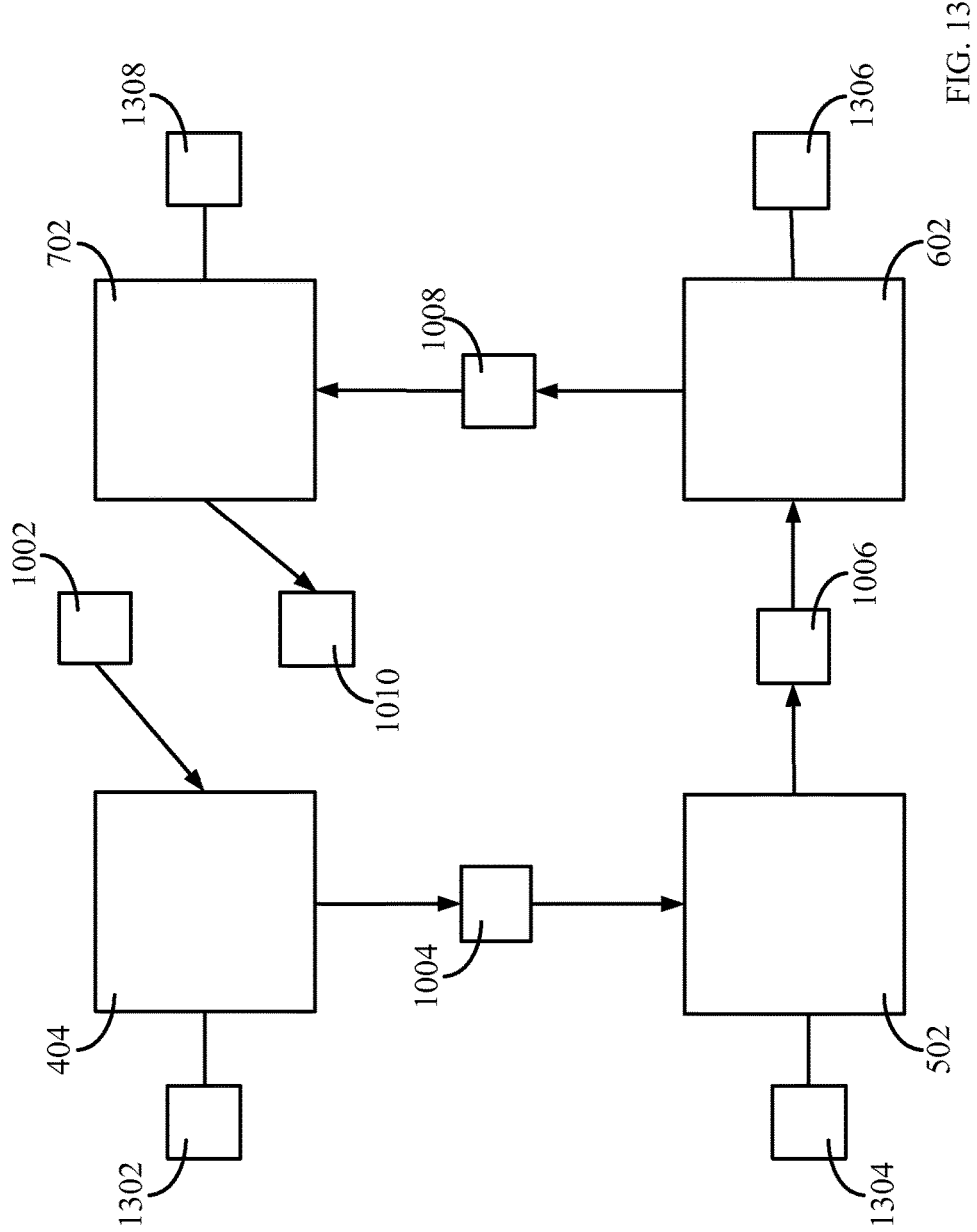
FIG. 13 is a diagram illustrating an example of blocks of instructions and associated real-time write masks.

FIG. 13 is a diagram illustrating an example of blocks of instructions 226 (see FIG. 2) and associated real-time write masks. The diagram includes, in addition to the elements illustrated in FIG. 10, a first real-time write mask 1302, a second real-time write mask 1304, a third real-time write mask 1306, and a fourth real-time write mask 1308. Each block of instructions 226 (see FIG. 2) can be associated with a real-time write mask. For example, the first real-time write mask 1302 can be associated with the first block of instructions 404, the a second real-time write mask 1304 can be associated with the second block of instructions 502, the third real-time write mask 1306 can be associated with the third block of instructions 602, and the fourth real-time write mask 1308 can be associated with the fourth block of instructions 702. Each bit in a real-time write mask can correspond to an architectural register. The real-time write mask can be indexed by reference to an architectural register. By way of example, and not by way of limitation, if the block-based instruction set architecture defines a set of architectural registers that includes 64 architectural registers, then the real-time write mask can include 64 bits. By way of example, and not by way of limitation, a value of a bit of the real-time write mask can initially be set to one if the corresponding architectural register is an object of a write instruction, of the corresponding block of instructions 226, that has executed on the block-based computer processor core 114, is executing on the block-based computer processor core 114, or is expected to execute on the block-based computer processor core 114; otherwise, the value of the bit of the real-time write mask can be set to zero.

In an aspect, the first real-time write mask 1302 can initially be produced by having the values of the bits of the write mask 1202 (see FIG. 12) of the block header of the first block of instructions 404 copied to the corresponding bits of the first real-time write mask 1302 after the block header of the first block of instructions 404 has been fetched, but before instructions of the first block of instructions 404 commence being executed. The other real-time write masks can initially be produced in the same manner.

In response to an annulment, the bit in the real-time write mask that corresponds to the architectural register, which was identified in the block header of the corresponding block of instructions 226 (see FIG. 2) as the object of a write instruction, of the corresponding block of instructions 226, that was expected to execute on the block-based computer processor core 114, but which in actuality is to maintain the value that was written by a write instruction of a previous block of instructions 226, can be changed from one to zero to reflect that this architectural register will maintain the value that was written by a write instruction of a previous block of instructions 226.

As described above, the block-based computer processing unit 102 (see FIG. 1) can be configured to cause the at least one block-based computer processor core 114 to operate in conjunction with at least one other block-based computer processor core 114 as a core composition. As described above, the distribution of the instructions across the blocks of instructions 226 (see FIG. 2) and the distribution of the blocks of instructions 226 among the block-based computer processor cores 114 can complicate efforts to map architectural registers to physical registers that reside within the register unit 218 of the block-based computer processor cores 114. In an aspect, at least one block-based computer processor core 114 may at least produce, store, and/or maintain at least one inter-core register rename map.

Figure 14:
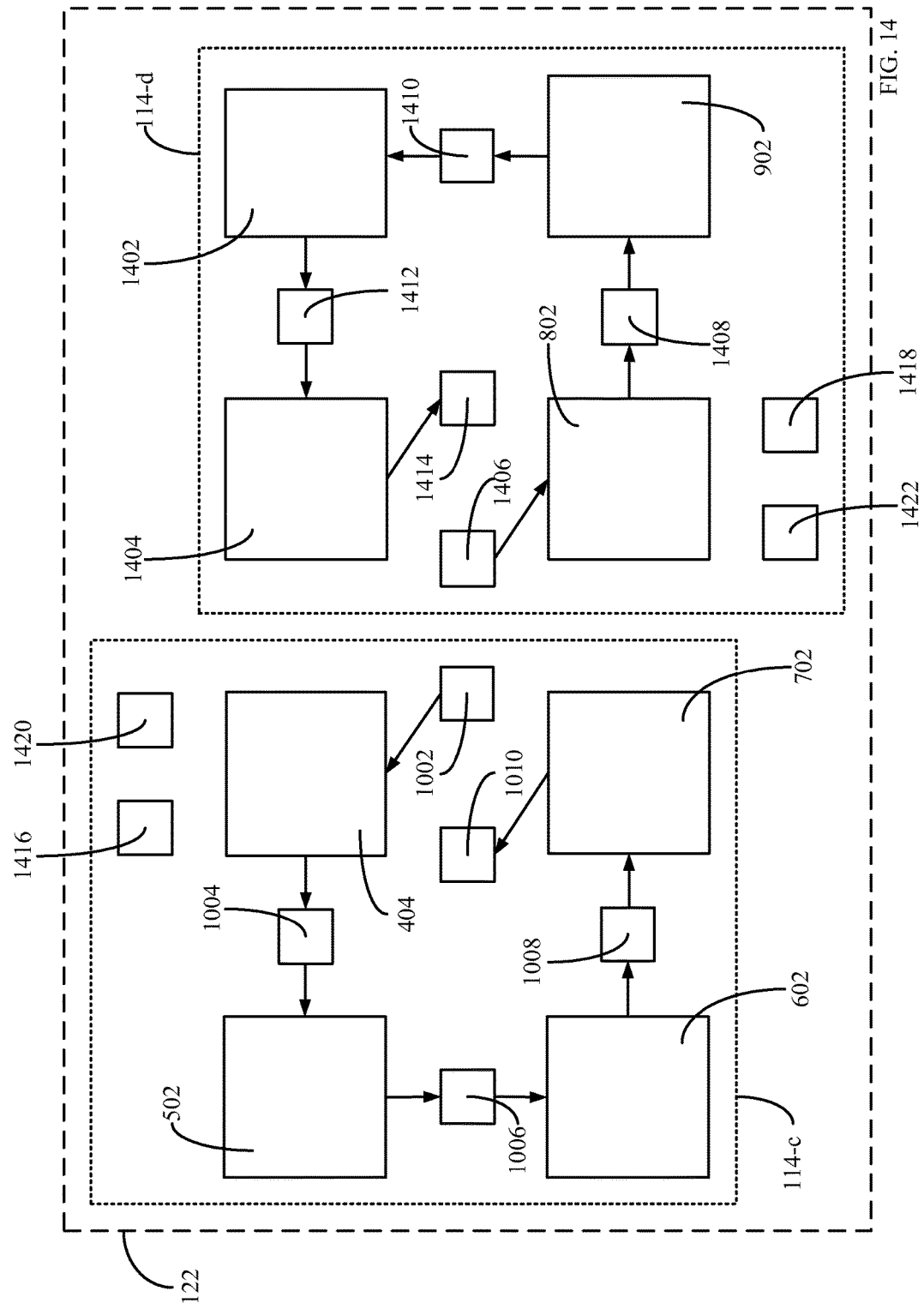
FIG. 14 is a diagram illustrating an example of blocks of instructions and associated inter-core register rename maps.

FIG. 14 is a diagram illustrating an example of blocks of instructions 226 (see FIG. 2) and associated inter-core register rename maps. In the diagram, the blocks of instructions 226 are distributed among the block-based computer processor cores 114 as a core composition. For example, the core composition illustrated in FIG. 14 can be the second core composition 122 illustrated in FIG. 1. The second core composition 122 can include the block-based computer processor core 114-c and the block-based computer processor core 114-d. The block-based computer processor core 114-c can include the elements illustrated in FIG. 10. The block-based computer processor core 114-d can include a similar arrangement of elements.

For example, regarding the block-based computer processor core 114-d, the diagram includes the fifth block of instructions 802 (see FIGS. 8 and 9) (conveyed to a corresponding one of the arrays 304 of the block-based computer processor core 114-d), the sixth block of instructions 902 (see FIG. 9) (conveyed to a corresponding one of the arrays 304 of the block-based computer processor core 114-d), a seventh block of instructions 1402 (conveyed to a corresponding one of the arrays 304 of the block-based computer processor core 114-d), and an eighth block of instructions 1404 (conveyed to a corresponding one of the arrays 304 of the block-based computer processor core 114-d). Regarding the block-based computer processor core 114-d, the diagram also includes a sixth intra-core register rename map 1406, a seventh intra-core register rename map 1408, an eighth intra-core register rename map 1410, a ninth intra-core register rename map 1412, and a tenth intra-core register rename map 1414.

Regarding the block-based computer processor core 114-c, the diagram also includes a first inter-core register rename map 1416 and a third inter-core register rename map 1420. Regarding the block-based computer processor core 114-d, the diagram also includes a second inter-core register rename map 1418 and a fourth inter-core register rename map 1422. As described above, an intra-core register rename map 1100 can include information that indicates if a physical register is a location of a most recent write to a corresponding architectural register that has been executed by the block-based computer processor core (e.g., the block-based computer processor core 114-c), the most recent write being according to program order. An inter-core register rename map can include an identification of a specific block-based computer processor core 114, in a core composition, that includes a physical register that is a location of a most recent write to a corresponding architectural register that has been executed by the specific block-based computer processor core 114, is executing on the specific block-based computer processor core 114, or is expected to execute on the specific block-based computer processor core 114, the most recent write being according to program order.

Figure 15:
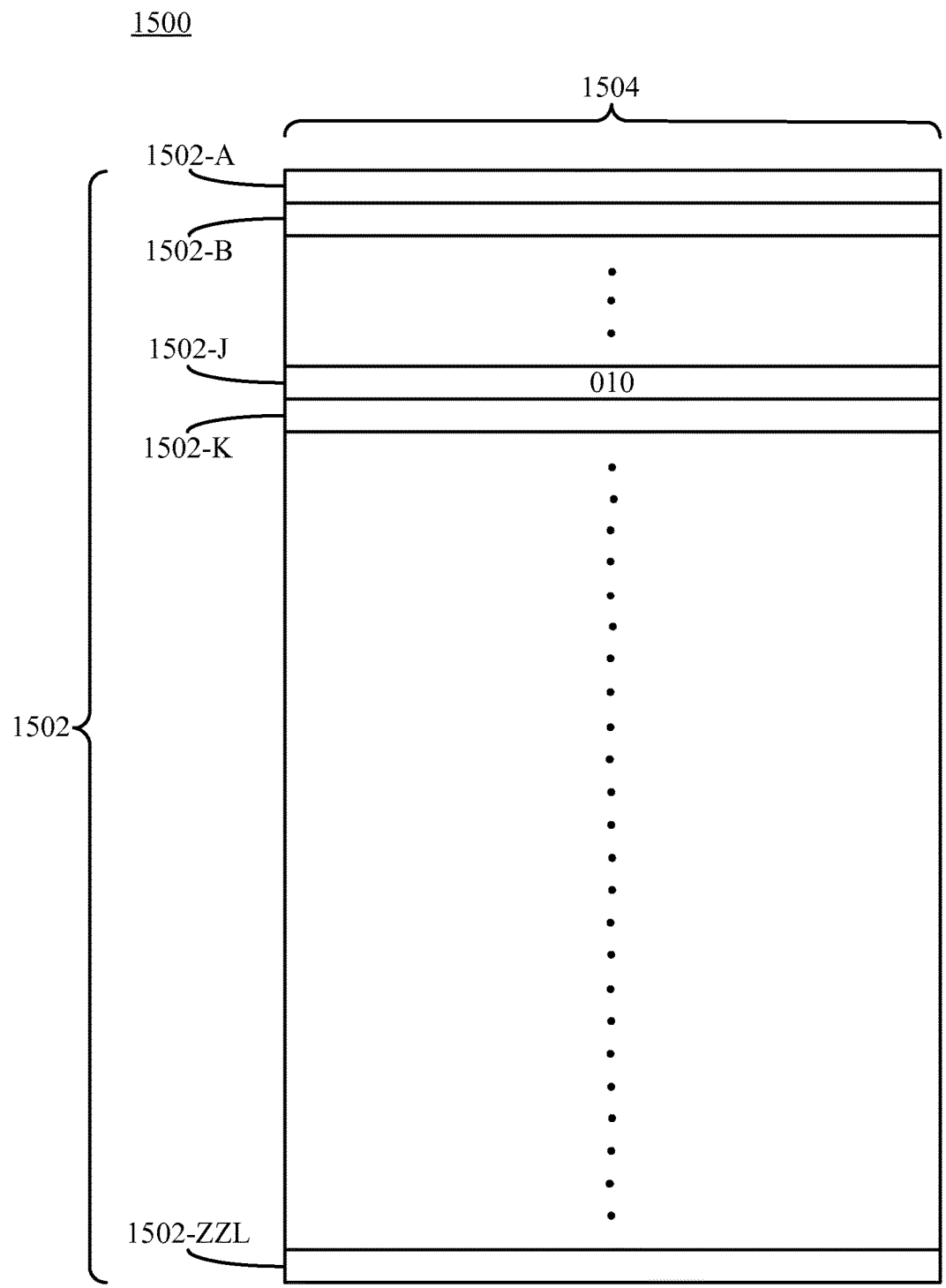
FIG. 15 is a diagram illustrating an example of an inter-core register rename map.

FIG. 15 is a diagram illustrating an example of an inter-core register rename map 1500. The inter-core register rename map 1500 can include a set of records 1502 that corresponds to a set of architectural registers defined by the block-based instruction set architecture. Each record of the set of records 1502 can correspond to an architectural register. The inter-core register rename map 1500 can be indexed by a reference to an architectural register. By way of example, and not by way of limitation, if the block-based instruction set architecture defines a set of architectural registers that includes 64 architectural registers, then the inter-core register rename map 1500 can include 64 records. In an aspect, the inter-core register rename map 1500 can be stored in the register unit 218 (see FIG. 2).

Each record of the set of records 1502 can include a field 1504 to store an identification of a specific block-based computer processor core 114 (see FIG. 1), in a core composition, that includes a physical register that is a location of a most recent write to a corresponding architectural register that has been executed by the specific block-based computer processor core 114, is executing on the specific block-based computer processor core 114, or is expected to execute on the specific block-based computer processor core 114, the most recent write being according to program order. The identification of the specific block-based computer processor core 114 can be a core number defined by the block-based computer processing unit 102 (see FIG. 1) when the block-based computer processing unit 102 causes at least one block-based computer processor core 114 to operate in conjunction with at least one other block-based computer processor core 114. The core number can be represented in binary form using $\log_2 N$ number of bits in which N can be the number of block-based computer processor cores 114 in the core composition. For example, if the number of block-based computer processor cores 114 in the core composition is two (as illustrated in FIG. 14), then the core number can be represented in binary form using one bit, if the number of block-based computer processor cores 114 in the core composition is four, then the core number can be represented in binary form using two bits, if the number of block-based computer processor cores 114 in the core composition is eight, then the core number can be represented in binary form using three bits (as illustrated in FIG. 15), etc.

For example, as illustrated in FIG. 15, the inter-core register rename map 1500 can include a record 1502-J that corresponds to the architectural register J. For example, the field 1504 of the record 1502-J can store the core number 010, which is the identification of the third block-based computer processor core 114 (as defined by the block-based computer processing unit 102 (see FIG. 1) when the block-based computer processing unit 102 causes this block-based computer processor core 114 to operate in conjunction with seven other block-based computer processor cores 114 as a core composition of eight block-based computer processor cores 114). Thus, the third block-based computer processor core 114 (core number 010) can be the block-based computer processor core 114, in the core composition, that includes the physical register that is a location of a most recent write to the architectural register J that has been executed by the third block-based computer processor core 114 (core number 010), is executing on the third block-based computer processor core 114 (core number 010), or is expected to execute on the third block-based computer processor core 114 (core number 010), the most recent write being according to program order.

With reference to FIG. 14, each block-based computer processor core 114 can be associated with a first phase of execution inter-core register rename map and a second phase of execution inter-core register rename map. For example, the first inter-core register rename map 1416 can be a first phase of execution inter-core register rename map associated with the block-based computer processor core 114-c and the third inter-core register rename map 1420 can be a second phase of execution inter-core register rename map associated with the block-based computer processor core 114-c. For example, the second inter-core register rename map 1418 can be a first phase of execution inter-core register rename map associated with the block-based computer processor core 114-d and the fourth inter-core register rename map 1422 can be a second phase of execution inter-core register rename map associated with the block-based computer processor core 114-d. The first phase of execution inter-core register rename map can be referenced by instructions of the blocks of instructions 226 (see FIG. 2) associated with the first phase of execution and the second phase of execution inter-core register rename map can be referenced by instructions of the blocks of instructions 226 associated with the second phase of execution.

Figure 16:
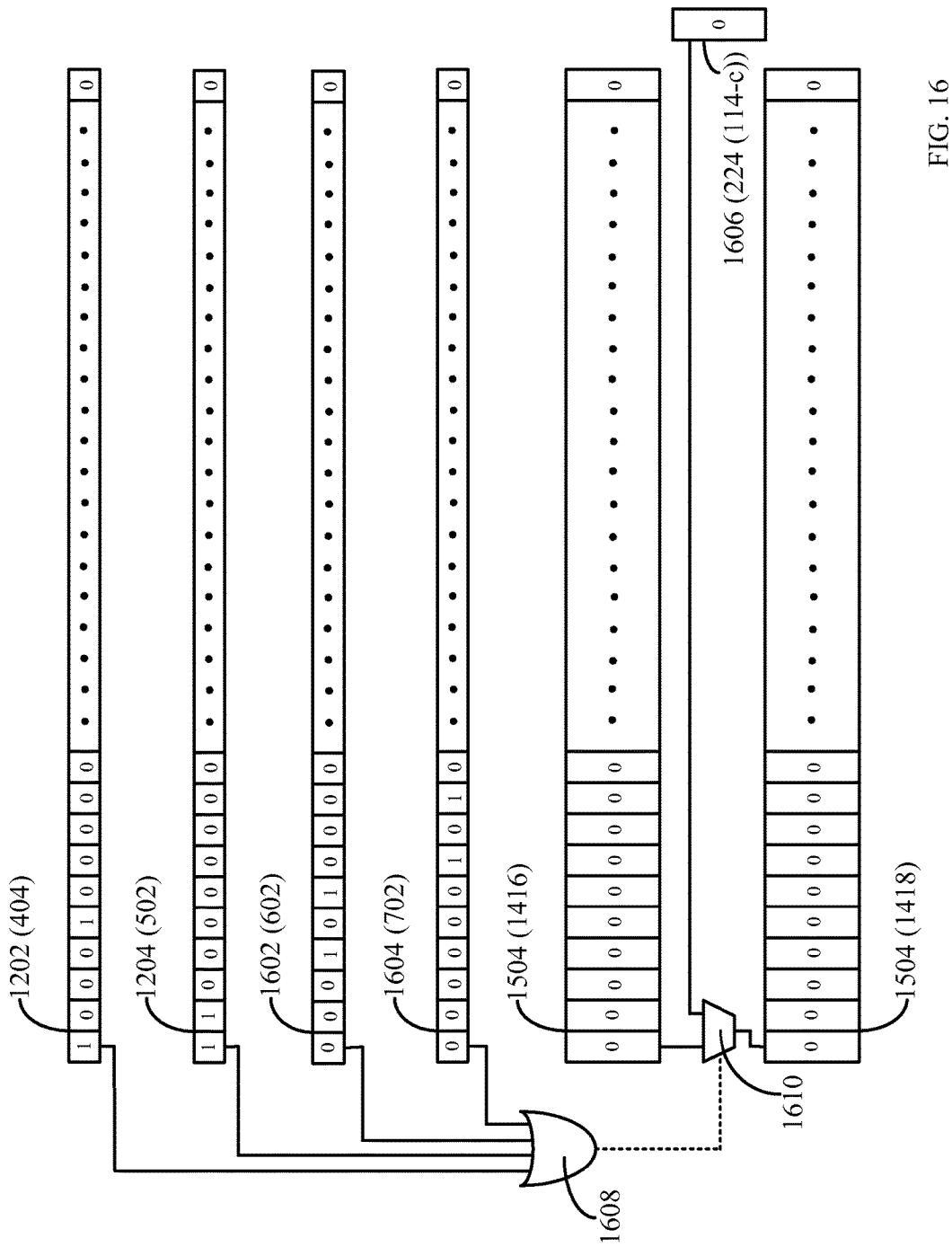
FIGS. 16 and 17 are diagrams illustrating an example of a process that produces the inter-core register rename map illustrated in FIG. 15.
Figure 17:
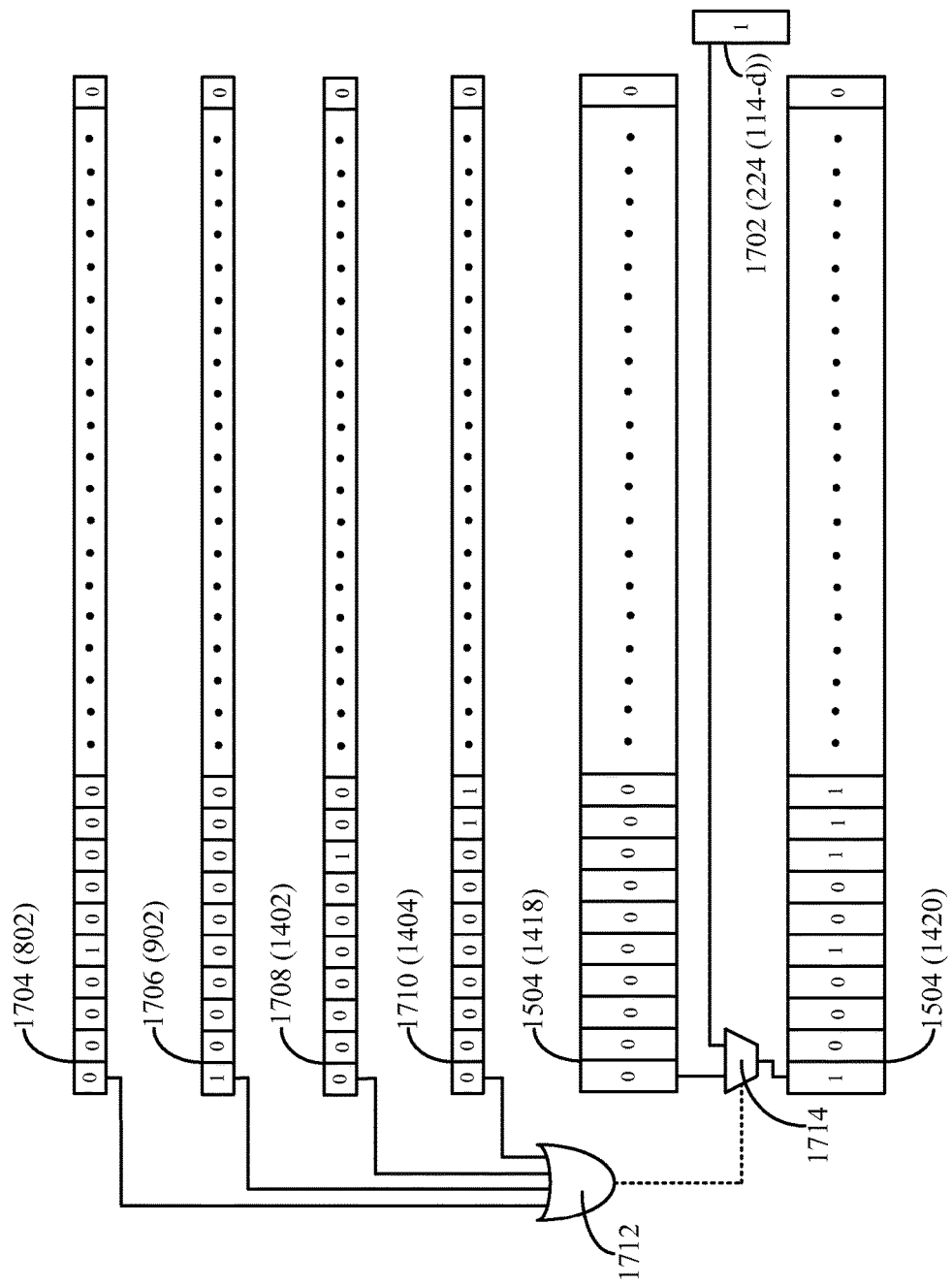

FIGS. 16 and 17 are diagrams illustrating an example of a process that produces the inter-core register rename map 1500. With reference to FIG. 16, the diagram includes the write mask 1202 of the block header of the first block of instructions 404, the write mask 1204 of the block header of the second block of instructions 502, a write mask 1602 of the block header of the third block of instructions 602, a write mask 1604 of the block header of the fourth block of instructions 702, the field 1504 of the first inter-core register rename map 1416, and the field 1504 of the second inter-core register rename map 1418.

As described above with reference to FIG. 14, the first inter-core register rename map 1416 can be the first phase of execution inter-core register rename map associated with the block-based computer processor core 114-c. For example, when the block-based computer processing unit 102 (see FIG. 1) causes the block-based computer processor core 114-c to operate in conjunction with the block-based computer processor core 114-d as the second core composition 122, the block-based computer processing unit 102 can define the block-based computer processor core 114-*c* as the first block-based computer processor core 114 (core number 0) and the block-based computer processor core 114-*d* as the second block-based computer processor core 114 (core number 1). In an aspect, the identification of the block-based computer processor core 114-*c* as the first block-based computer processor core 114 (core number 0) can be stored in a set of memory cells 1606 (see FIG. 16) in the core composition interface 224 (see FIG. 1) of the block-based computer processor core 114-*c* and the identification of the block-based computer processor core 114-*d* as the second block-based computer processor core 114 (core number 1) can be stored in a set of memory cells 1702 (see FIG. 17) in the core composition interface 224 of the block-based computer processor core 114-*d*.

If the first block of instructions 404 is an initial block of instructions 226 (see FIG. 2) of the computer program and the block-based computer processor core 114-*c* is an initial block-based computer processor core 114 on which the initial blocks of instructions 226 is to be executed, then the value of each field 1504 of the first inter-core register rename map 1416 can be set to the identification of the block-based computer processor core 114-*c* (core number 0). The first inter-core register rename map 1416 can be stored in the register unit 218 (see FIG. 2) of the block-based computer processor core 114-*c*.

With reference to FIGS. 14 through 16, in an aspect, a value of the field 1504 of the second inter-core register rename map 1418 can be produced after the block header of the first block of instructions 404 has been fetched, the block header of the second block of instructions 502 has been fetched, the block header of the third block of instructions 602 has been fetched, and the block header of the fourth block of instructions 702 has been fetched.

A value of the field 1504 of the second inter-core register rename map 1418 can be produced from a value of a corresponding bit of the write mask 1202 of the block header of the first block of instructions 404, a value of a corresponding bit of the write mask 1204 of the block header of the second block of instructions 502, a value of a corresponding bit of the write mask 1602 of the block header of the third block of instructions 602, and a value of a corresponding bit of the write mask 1604 of the block header of the fourth block of instructions 702 by performing a bitwise logic operation. The value of the bit of the write mask 1202 of the block header of the first block of instructions 404 that corresponds to a particular architectural register can be a first input to an OR gate, for example OR gate 1608. The value of the bit of the write mask 1204 of the block header of the second block of instructions 502 that corresponds to the particular architectural register can be a second input to the OR gate (e.g., OR gate 1608). The value of the bit of the write mask 1602 of the block header of the third block of instructions 602 that corresponds to the particular architectural register can be a third input to the OR gate (e.g., OR gate 1608). The value of the bit of the write mask 1604 of the block header of the fourth block of instructions 702 that corresponds to the particular architectural register can be a fourth input to the OR gate (e.g., OR gate 1608).

The output of the OR gate (e.g., OR gate 1608) can be a selector input to a multiplexer, for example multiplexer 1610. The value of the field 1504, that corresponds to the particular architectural register, of the first inter-core register rename map 1416 can be a first input to the multiplexer (e.g., multiplexer 1610). The identification of the block-based computer processor core 114-*c* (core number 0), which is stored in the set of memory cells 1606 in the core composition interface 224 (see FIG. 1) of the block-based computer processor core 114-*c*, can be a second input to the multiplexer (e.g., multiplexer 1610). If a value of the output of the OR gate (e.g., OR gate 1608) is one, then the value of the field 1504, that corresponds to the particular architectural register, of the second inter-core register rename map 1418 can be set to the identification of the block-based computer processor core 114-*c* (core number 0); otherwise, the value of the field 1504, that corresponds to the particular architectural register, of the second inter-core register rename map 1418 can be set to the value of the field 1504, that corresponds to the particular architectural register, of the first inter-core register rename map 1416. In this manner, the second inter-core register rename map 1418 can be produced. The second inter-core register rename map 1418 can be stored in the register unit 218 (see FIG. 2) of the block-based computer processor core 114-*d*.

With reference to FIG. 17, the diagram includes a write mask 1704 of the block header of the fifth block of instructions 802, a write mask 1706 of the block header of the sixth block of instructions 902, a write mask 1708 of the block header of the seventh block of instructions 1402, a write mask 1710 of the block header of the eighth block of instructions 1404, the field 1504 of the second inter-core register rename map 1418, and the field 1504 of the third inter-core register rename map 1420.

With reference to FIGS. 14, 15, and 17, in an aspect, a value of the field 1504 of the third inter-core register rename map 1420 can be produced after the block header of the fifth block of instructions 802 has been fetched, the block header of the sixth block of instructions 902 has been fetched, the block header of the seventh block of instructions 1402 has been fetched, and the block header of the eighth block of instructions 1404 has been fetched.

A value of the field 1504 of the third inter-core register rename map 1420 can be produced from a value of a corresponding bit of the write mask 1704 of the block header of the fifth block of instructions 802, a value of a corresponding bit of the write mask 1706 of the block header of the sixth block of instructions 902, a value of a corresponding bit of the write mask 1708 of the block header of the seventh block of instructions 1402, and a value of a corresponding bit of the write mask 1710 of the block header of the eighth block of instructions 1404 by performing a bitwise logic operation. The value of the bit of the write mask 1704 of the block header of the fifth block of instructions 802 that corresponds to the particular architectural register can be a first input to an OR gate, for example OR gate 1712. The value of the bit of the write mask 1706 of the block header of the sixth block of instructions 902 that corresponds to the particular architectural register can be a second input to the OR gate (e.g., OR gate 1712). The value of the bit of the write mask 1708 of the block header of the seventh block of instructions 1402 that corresponds to the particular architectural register can be a third input to the OR gate (e.g., OR gate 1712). The value of the bit of the write mask 1710 of the block header of the eighth block of instructions 1404 that corresponds to the particular architectural register can be a fourth input to the OR gate (e.g., OR gate 1712).

The output of the OR gate (e.g., OR gate 1712) can be a selector input to a multiplexer, for example multiplexer 1714. The value of the field 1504, that corresponds to the particular architectural register, of the second inter-core register rename map 1418 can be a first input to the multiplexer (e.g., multiplexer 1714). The identification of the block-based computer processor core 114-*d* (core number 1), which is stored in the set of memory cells 1702 in the core composition interface 224 (see FIG. 1) of the block-based computer processor core 114-*d*, can be a second input to the multiplexer (e.g., multiplexer 1714). If a value of the output of the OR gate (e.g., OR gate 1712) is one, then the value of the field 1504, that corresponds to the particular architectural register, of the third inter-core register rename map 1420 can be set to the identification of the block-based computer processor core 114-*d* (core number 1); otherwise, the value of the field 1504, that corresponds to the particular architectural register, of the third inter-core register rename map 1420 can be set to the value of the field 1504, that corresponds to the particular architectural register, of the second inter-core register rename map 1418. In this manner, the third inter-core register rename map 1420 can be produced. The third inter-core register rename map 1420 can be stored in the register unit 218 (see FIG. 2) of the block-based computer processor core 114-*c*. Other inter-core register rename maps can be produced in the same manner.

Alternatively, in an aspect, the process of producing a value of a field 1504 of an inter-core register rename map, described above with reference to FIGS. 14 through 17, can be performed using the real-time write masks rather than the write masks of the block headers of the blocks of instructions 226 (see FIG. 2) (e.g., the field 1504 of the second inter-core register rename map 1418 can be produced from a corresponding bit of the first real-time write mask 1302 (see FIG. 13), a corresponding bit of the second real-time write mask 1304, a corresponding bit of the third real-time write mask 1306, and a corresponding bit of the fourth real-time write mask 1308 by performing a bitwise OR operation).

In this manner, under either alternative, if the particular architectural register was an object of a write instruction of the blocks of instructions 226 (see FIG. 2) executed by the block-based computer processor core 114-*c* and later was an object of a write instruction of the blocks of instructions 226 executed by the block-based computer processor core 114-*d*, the third inter-core register rename map 1420 can reflect the identification of the block-based computer processor core 114-*d* (e.g., core number 1) as the current block-based computer processor core 114 that includes the physical register that is a location of a most recent write to the particular architectural register that has been executed by the block-based computer processor core 114-*d* (e.g., core number 1), is executing on the block-based computer processor core 114-*d* (e.g., core number 1), or is expected to execute on the block-based computer processor core 114-*d* (e.g., core number 1), the most recent write being according to program order. Likewise, if the particular architectural register was an object of a write instruction of the blocks of instructions 226 executed by the block-based computer processor core 114-*c* and later was not an object of a write instruction of the blocks of instructions 226 executed by the block-based computer processor core 114-*d*, the third inter-core register rename map 1420 can reflect the identification of the block-based computer processor core 114-*c* (e.g., core number 0) as the current block-based computer processor core 114 that includes the physical register that is a location of a most recent write to the particular architectural register that has been executed by the block-based computer processor core 114-*c* (e.g., core number 0), is executing on the block-based computer processor core 114-*c* (e.g., core number 0), or is expected to execute on the block-based computer processor core 114-*c* (e.g., core number 0), the most recent write being according to program order.

As described above, with reference to FIG. 9, in a single block-based computer processor core mode of operation, the fifth block of instructions 802 can be stored in the at least one instruction decode stage 208 until the first block of instructions 404 can complete execution of its instructions and can commit to its authentic results so that its corresponding one of the arrays 304 can be available to support execution of the fifth block of instructions 802 during a second phase of execution.

However, if the block-based computer processing unit 102 (see FIG. 1) has caused several of the block-based computer processor cores 114 to operate as a core composition (as illustrated in FIG. 14), then the fifth block of instructions 802 can be conveyed to another block-based computer processor core 114 (e.g., the block-based computer processor core 114-*d*) to be executed during the same phase of execution as the execution of the first block of instructions 404, the second block of instructions 502, the third block of instructions 602, and the fourth block of instructions 702. Likewise, in this situation the sixth block of instructions 902, the seventh block of instructions 1402, and the eighth block of instructions 1404 can be conveyed to another block-based computer processor core 114 (e.g., the block-based computer processor core 114-*d*) to be executed during the same phase of execution as the execution of the first block of instructions 404, the second block of instructions 502, the third block of instructions 602, and the fourth block of instructions 702.

In the core composition 122 illustrated in FIG. 14, because the fifth block of instructions 802 is an initial block of instructions 226 (see FIG. 2) to be executed on the block-based computer processor core 114-*d*, values of each second field 1106 of the sixth intra-core register rename map 1406, which is the input intra-core register rename map associated with the fifth block of instructions 802, can be set to zero.

In the core composition 122 illustrated in FIG. 14, a ninth block of instructions (not illustrated) can be stored in the at least one instruction decode stage 208 (see FIG. 9) until the first block of instructions 404 can complete execution of its instructions and can commit to its authentic results so that its corresponding one of the arrays 304 can be available to support execution of the ninth block of instructions during a second phase of execution.

In the core composition 122 illustrated in FIG. 14, the fifth intra-core register rename map 1010 can be the input intra-core register rename map for the ninth block of instructions (not illustrated). However, because a value of the second field 1106 of the fifth intra-core register rename map 1010 can initially be produced from a value of the second field 1106 of the fourth intra-core register rename map 1008 and a value of a corresponding bit of the write mask 1604 (see FIG. 16) of the block header of the fourth block of instructions 702 by performing a bitwise logic operation as described above, the fifth intra-core register rename map 1010 can lack information about whether a particular architectural register was an object of a write instruction of the blocks of instructions 226 (see FIG. 2) executed by the block-based computer processor core 114-*d*. This can be a special situation for an initial block of instructions 226 (see FIG. 2) to be executed on a block-based computer processor core 114 in a subsequent phase of execution.

In an aspect, at least one block-based computer processor core 114 may at least produce, store, and/or maintain at least one inter-core write mask. In an aspect, the at least one inter-core write mask can be stored in the register unit 218 (see FIG. 2). In an aspect, in response to this situation, the block-based computer processing unit 102 (see FIG. 1) can be configured to: (1) recognize when a block of instructions 226 is an initial block of instructions 226 to be executed on a block-based computer processor core 114 in a subsequent phase of execution, (2) cause an instruction of the initial block of instructions 226 to reference both the input intra-core register rename map associated with the initial block of instructions 226 and the inter-core write mask associated with the block-based computer processor core 114 and with the subsequent phase of execution, and (3) alter the process that produces the output intra-core register rename map associated with the initial block of instructions 226.

Figure 18:
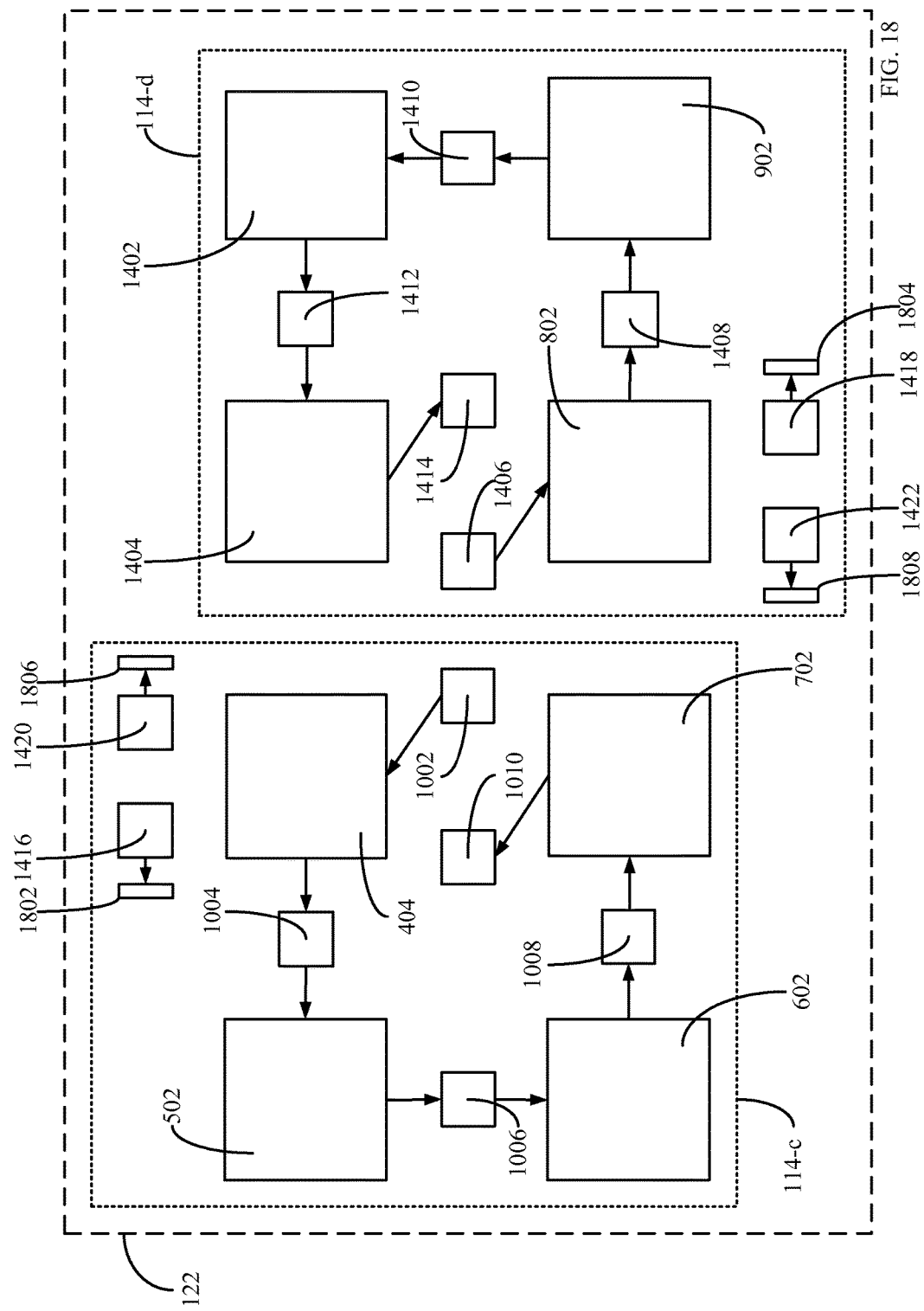
FIG. 18 is a diagram illustrating an example of blocks of instructions and associated inter-core write maps.

FIG. 18 is a diagram illustrating an example of blocks of instructions 226 (see FIG. 2) and associated inter-core write masks. The diagram includes, in addition to the elements illustrated in FIG. 14, a first inter-core write mask 1802, a second inter-core write mask 1804, a third inter-core write mask 1806, and a fourth inter-core write mask 1808. Each inter-core register rename map can be associated with an inter-core write mask. For example, the first inter-core write mask 1802 can be associated with the first inter-core register rename map 1416, the second inter-core write mask 1804 can be associated with the second inter-core register rename map 1418, the third inter-core write mask 1806 can be associated with the third inter-core register rename map 1420, and the fourth inter-core write mask 1808 can be associated with the fourth inter-core register rename map 1422. Each bit in an inter-core write mask can correspond to an architectural register. The inter-core write mask can be indexed by reference to an architectural register. By way of example, and not by way of limitation, if the block-based instruction set architecture defines a set of architectural registers that includes 64 architectural registers, then the inter-core write mask can include 64 bits. By way of example, and not by way of limitation, a value of a bit of the inter-core write mask can be set to one if a most recent write to the corresponding architectural register has been executed by a block-based computer processor core 114 that is not the block-based computer processor core 114 associated with the inter-core write mask, is executing on the block-based computer processor core 114 that is not the block-based computer processor core 114 associated with the inter-core write mask, or is expected to execute on the block-based computer processor core 114 that is not the block-based computer processor core 114 associated with the inter-core write mask, the most recent write being according to program order; otherwise, the value of the bit of the inter-core write mask can be set to zero. Accordingly, the inter-core write mask can be a summary of its associated inter-core register rename map.

Figure 19:
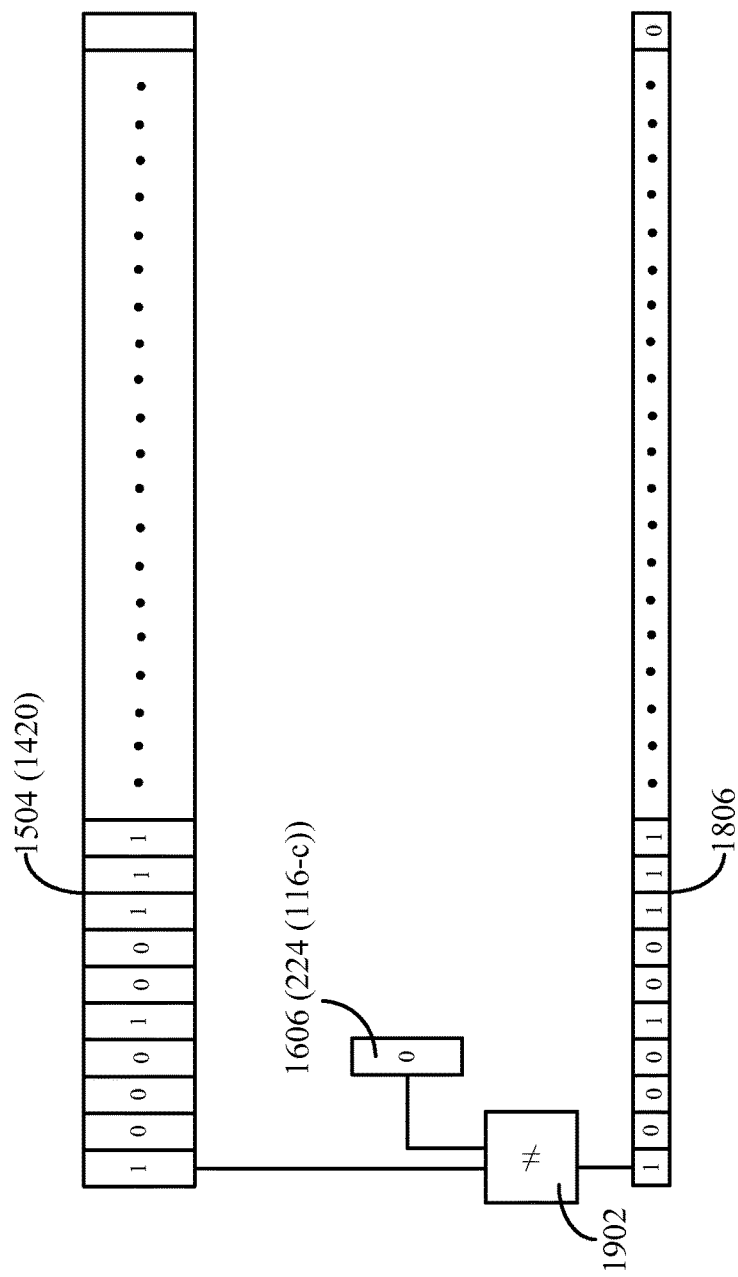
FIG. 19 is a diagram illustrating an example of a process that produces an inter-core write mask.

FIG. 19 is a diagram illustrating an example of a process that produces an inter-core write mask. The diagram includes the field 1504 of the third inter-core register rename map 1420 and the third inter-core write mask 1806. A value of a bit of the third inter-core write mask 1806 can be produced from a value of a corresponding field 1504 of the third inter-core register rename map 1420. The value of the field 1504 of the third inter-core register rename map 1420 can be a first input to a comparator, for example comparator 1902. The identification of the block-based computer processor core 114-c (core number 0), which is stored in the set of memory cells 1606 (see FIG. 16) in the core composition interface 224 (see FIG. 1) of the block-based computer processor core 114-c, can be a second input to the comparator (e.g., comparator 1902). The comparator (e.g., comparator 1902) can be configured to compare the value of the field 1504 of the third inter-core register rename map 1420 with the identification of the block-based computer processor core 114-c (core number 0) and to produce a value of one in response to the value of the field 1504 of the third inter-core register write mask 1420 being different from the identification of the block-based computer processor core 114-c (core number 0); otherwise, the comparator (e.g., comparator 1902) can be configured to produce a value of zero. The output of the comparator (e.g., comparator 1902) can be the value of the corresponding bit of the third inter-core write mask 1806. In an aspect, the values of the bits of the third inter-core register write mask 1806 can be produced after the third inter-core register rename map 1420 has been produced. Other inter-core write masks can be produced in the same manner.

As described above, the inter-core write mask can be used in a situation in which a block of instructions 226 (see FIG. 2) has been recognized as an initial block of instructions 226 to be executed on block-based computer processor core 114 in a subsequent phase of execution. In executing an instruction of the initial block of instructions 226 (e.g., the ninth block of instructions), reference can initially be made to the input intra-core register rename map (e.g., the fifth intra-core register rename map 1010) to determine if a corresponding physical register is a location of a most recent write to the particular architectural register that has been executed by the block-based computer processor core 114 (e.g., the block-based computer processor core 114-c), the most recent write being according to program order. If the corresponding physical register is the location of the most recent write to the particular architectural register that has been executed by the block-based computer processor core 114 (e.g., the block-based computer processor core 114-c), the most recent write being according to program order (e.g., the value the second field 1106 of the fifth intra-core register rename map 1010 that corresponds to the particular architectural register has been set to one), then reference can be made to the inter-core write mask associated with the block-based computer processor core 114 and with the subsequent phase of execution (e.g., the third inter-core write mask 1806) to determine if a most recent write to the corresponding architectural register has been executed by a previous block-based computer processor core 114 that is not the block-based computer processor core 114 associated with the inter-core write mask (e.g., the block-based computer processor core 114-d), is executing on the previous block-based computer processor core 114 that is not the block-based computer processor core 114 associated with the inter-core write mask (e.g., the block-based computer processor core 114-d), or is expected to execute on the previous block-based computer processor core 114 that is not the block-based computer processor core 114 associated with the inter-core write mask (e.g., the block-based computer processor core 114-d), the most recent write being according to program order.

Figure 20:
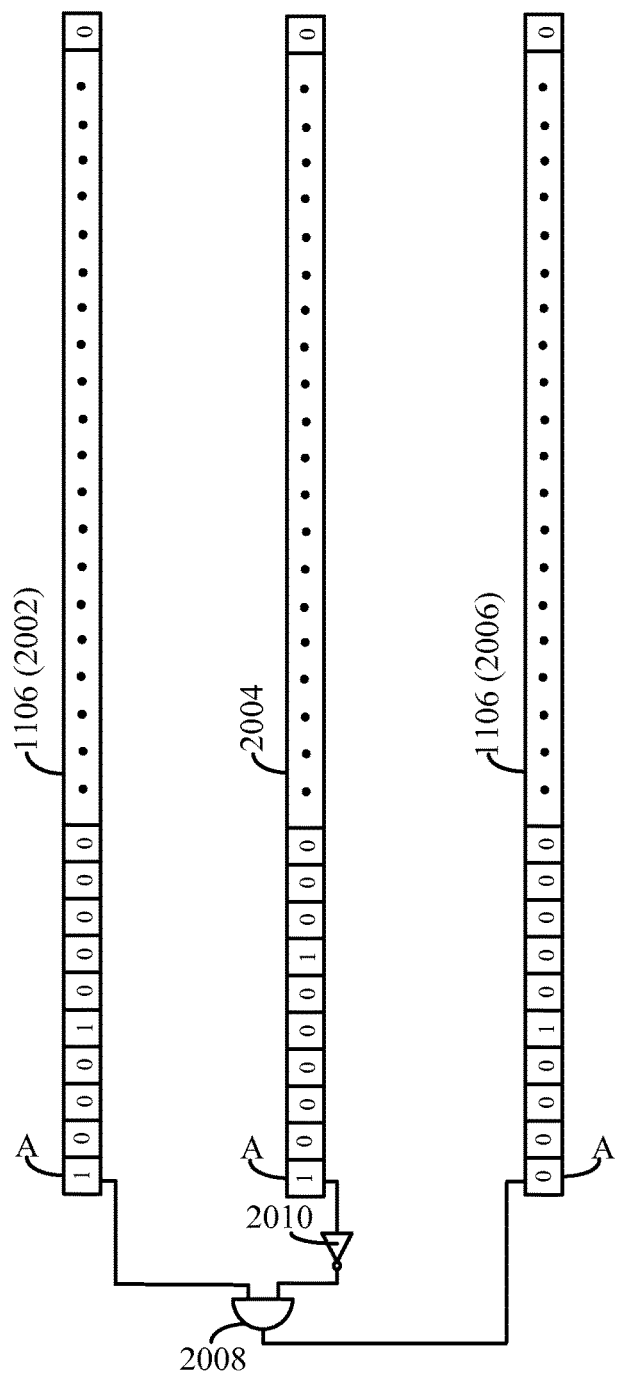
FIG. 20 is a diagram illustrating an example of a portion of an altered process that produces an output intra-core register rename map associated with an initial block of instructions to be executed on a block-based computer processor core in a subsequent phase of execution.

Additionally, in this situation, the process that produces the output intra-core register rename map associated with the initial block of instructions 226 can be altered. FIG. 20 is a diagram illustrating an example of a portion of an altered process that produces an output intra-core register rename map associated with an initial block of instructions 226 (see FIG. 2) to be executed on a block-based computer processor core 114 in a subsequent phase of execution. The diagram includes each second field 1106 (see FIG. 11) of an example of an input intra-core register rename map 2002, an example of an inter-core write mask 2004, and each second field 1106 of an example of a modified input intra-core register rename map 2006. A value of the second field 1106 of the modified input intra-core register rename map 2006 can be produced from a value of the second field 1106 of the input intra-core register rename map 2002 and the inter-core write mask 2004 by performing a bitwise logic operation. A value of the second field 1106 of the input intra-core register rename map 2002 can be a first input to an AND gate, for example AND gate 2008. A value of a corresponding bit of the inter-core write mask 2004 can be an input to an inverter, for example inverter 2010, and an output of the inverter (e.g., inverter 2010) can be a second input to the AND gate (e.g., AND gate 2008). A value of an output of the AND gate (e.g., AND gate 2008) can be a value of a corresponding second field 1106 of the modified input intra-core register rename map 2006.

In this manner, the modified input intra-core register rename map 2006 can correct the input intra-core register rename map 2002 for a most recent write to the corresponding architectural register has been executed by a previous block-based computer processor core 114, is executing on the previous block-based computer processor core 114, or is expected to execute on the previous block-based computer processor core 114, the most recent write being according to program order.

For example, as illustrated in FIG. 20, the value of the bit of the inter-core write mask 2004 that corresponds to the architectural register A is set to one, which can indicate that a most recent write to the architectural register A has been executed by a previous block-based computer processor core 114, is executing on the previous block-based computer processor core 114, or is expected to execute on the previous block-based computer processor core 114, the most recent write being according to program order. Because the most recent write to the architectural register A that has been executed by the previous block-based computer processor core 114, is executing on the previous block-based computer processor core 114, or is expected to execute on the previous block-based computer processor core 114, the most recent write being according to program order, can be the most recent value written to the architectural register A, the value of the second field 1106 of the input intra-core register rename map 2002 that corresponds to the architectural register A can be corrected to reflect that the most recent value written to the architectural register A is or will be stored in a physical register of the register unit 218 of the previous block-based computer processor core 114.

A value of the second field 1106 of the output intra-core register rename map associated with an initial block of instructions 226 (see FIG. 2) can initially be produced from a value of the second field 1106 of the modified input intra-core register rename map 2006 and a value of a corresponding bit of a write mask of a block header of a corresponding block of instructions (not illustrated) by performing a bitwise logic operation as described above.

Alternatively, in an aspect, the modified input intra-core register rename map 2006 can be used in place of the input intra-core register rename map 2002 so that a single reference can be made to the modified input intra-core register rename map 2006 rather than an initial reference to the input intra-core register rename map 2002 and a subsequent reference to the inter-core write mask 2004.

Figure 21:
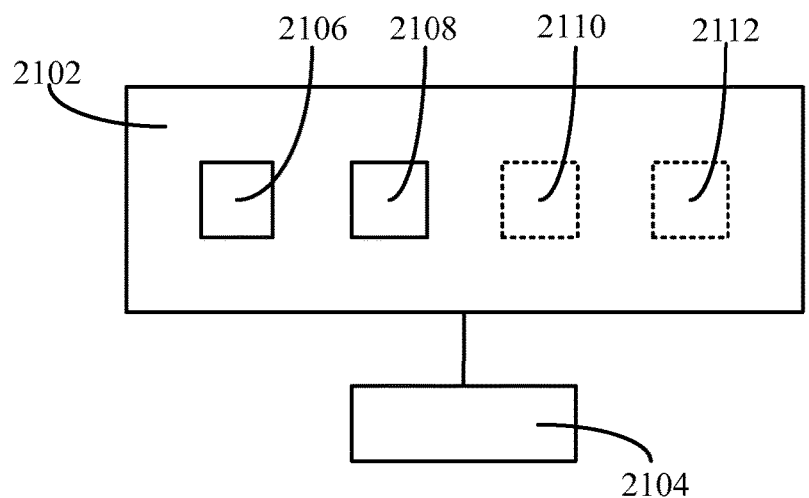
FIG. 21 is a block diagram of an apparatus for mapping an architectural register to a physical register.

FIG. 21 is a block diagram of an apparatus 2100 for mapping an architectural register to a physical register. The apparatus 2100 can include a memory 2102 and control circuitry 2104. In an aspect, the memory 2102 can be included in the register unit 218 (see FIG. 2). In an aspect, the control circuitry 2104 can be included in the instruction processing circuit 210 (see FIG. 2). The memory 2102 can be configured to store an intra-core register rename map 2106 and an inter-core register rename map 2108. The intra-core register rename map 2106 can be configured to map the architectural register to the physical register (see FIG. 11) of a first core of a multi-core processor (see FIG. 1). The inter-core register rename map 2108 can be configured to relate the architectural register to an identification of the first core (see FIG. 15) in response to determining that the physical register is a location of a most recent write to the architectural register that has been executed by the first core, is executing on the first core, or is expected to execute on the first core, the most recent write being according to a program order. The control circuitry 2104 can be configured to maintain the intra-core register rename map 2106 and the inter-core register rename map 2108.

In an aspect, the multi-core processor can be configured according to a block-based microarchitecture (see FIGS. 1 through 9). The first core can be configured to execute instructions assigned to blocks of instructions. The blocks of instructions can be configured according to a block-based instruction set architecture.

In an aspect, the intra-core register rename map 2106 can include a first input intra-core register rename map associated with a first block of instructions, a first output intra-core register rename map associated with the first block of instructions, a second input intra-core register rename map associated with a second block of instructions, and a second output intra-core register rename map associated with the second block of instructions (see FIG. 10).

In an aspect, the apparatus 2100 can be configured to reference, in conjunction with executing a read instruction, the first input intra-core register rename map to determine if the physical register is the location of the most recent write to the architectural register that has been executed by the first core, the most recent write being according to the program order. For example, with reference to FIGS. 10, 11, and 14, the apparatus 2100 can be configured to reference, in conjunction with executing a read instruction, the first intra-core register rename map 1002 to determine if the physical register number 0110011 is the location of the most recent write to the architectural register K that has been executed by the first core 114-c, the most recent write being according to the program order.

In an aspect, the first output intra-core register rename map can be the second input intra-core register rename map. For example, with reference to FIG. 10, the second intra-core register rename map 1004 can be the output intra-core register rename map associated with the first block of instructions 404 and the input intra-core register rename map associated with the second block of instructions 502.

In an aspect, the intra-core register rename map can include a record that corresponds to the architectural register. The record can have a first field to store an identification of the physical register that has been mapped to the architectural register. The record can have a second field. A value of the second field can be configured to indicate if the physical register is the location of the most recent write to the architectural register that has been executed by the first core, the most recent write being according to the program order. For example, with reference to FIGS. 11 and 14, the intra-core register rename map 1100 can include a record 1102-K that corresponds to the architectural register K. The record 1102-K can have a first field 1104 to store an identification of the physical register (e.g., physical register number 0110011) that has been mapped to the architectural register K. The record 1102-K can have a second field 1106. A value of the second field 1106 (e.g., 1) can be configured to indicate if the physical register number 0110011 is the location of the most recent write to the architectural register K that has been executed by the first core 114-*c*, the most recent write being according to the program order.

In an aspect, the apparatus 2100 can be configured to determine, in conjunction with executing a write instruction, an intermediate block of instructions between the first block of instructions and a subsequent block of instructions having a subsequent write instruction. The apparatus 2100 can be configured to copy the identification of the physical register, stored in the first field of the first output intra-core register rename map, to a corresponding first field of an output intra-core register rename map associated with the intermediate block of instructions.

For example, with reference to FIGS. 10, 11, and 14, if the write instruction is of the first block of instructions 404 and the third block of instructions 602 is a subsequent block of instructions having a subsequent write instruction, then the apparatus 2100 can be configured to determine that the second block of instructions 502 is an intermediate block of instructions between the first block of instructions 404 and the subsequent block of instructions (e.g., the third block of instructions 602). The apparatus 2100 can be configured to copy the identification of the physical register (e.g., physical register number 0110011), stored in the first field 1104 of the second intra-core register rename map 1004, to a corresponding first field 1104 of the third intra-core register rename map 1006 associated with the second block of instructions 502. In this manner, the third intra-core register rename map 1006 can be made to reflect that the physical register number 0110011 is the location of the most recent write to the architectural register K that has been executed by the first core 114-*c*, the most recent write being according to the program order.

In an aspect, the first block of instructions can include a block header having a write mask. The write mask can have a bit that corresponds to the architectural register. A value of the bit can be configured to indicate if the architectural register is an object of a write instruction, of the first block of instructions, expected to execute on the first core.

In an aspect, the memory 2102 can be further configured to store a real-time write mask 2110. The control circuitry 2104 can be further configured to maintain the real-time write mask 2110. The real-time write mask 2110 can be associated with the first block of instructions. The real-time write mask 2110 can have a bit that corresponds to the architectural register. A value of the bit of the real-time write mask 2110 can be configured to indicate if the architectural register, that is the object of the write instruction, of the first block of instructions, that is expected to execute on the first core, in actuality is to maintain a value that was written by a write instruction of a previous block of instructions. For example, with reference to FIG. 13, the first real-time write mask 1302 can be associated with the first block of instructions 404.

In an aspect, the apparatus 2100 can be configured to determine, in response to a determination that the architectural register in actuality is to maintain the value that was written by the write instruction of the previous block of instructions, an intermediate block of instructions between the first block of instructions and a subsequent block of instructions having a subsequent write instruction. The apparatus 2100 can be configured to copy the identification of the physical register, stored in the first field of the first input intra-core register rename map, to a corresponding first field of the first output intra-core register rename map and to a corresponding first field of an output intra-core register rename map associated with the intermediate block of instructions.

For example, with reference to FIGS. 10, 11, 12, and 14, if a bit, of a write mask of a block header of the first block of instructions 404, that corresponds to the architectural register K indicates that the architectural register K is an object of a write instruction, of the first block of instructions 404, that is expected to execute on the first core 114-*c*, but the architectural register K in actuality is to maintain a value that was written by a write instruction of a previous block of instructions, the state of the architectural register K indicated in the second field 1106 of the second intra-core register rename map 1004 can be incorrect. Because the second field 1106 of the second intra-core register rename map 1004 can be used to produce the second field 1106 of the third intra-core register rename map 1006, the state of the architectural register K indicated in the second field 1106 of the third intra-core register rename map 1006 can also be incorrect. In this case, the state of the architectural register K indicated in the second field 1106 of the first intra-core register rename map 1002 can be correct. If the third block of instructions 602 is a subsequent block of instructions having a subsequent write instruction, then the apparatus 2100 can be configured to determine that the second block of instructions 502 is an intermediate block of instructions between the first block of instructions 404 and the subsequent block of instructions (e.g., the third block of instructions 602). The apparatus 2100 can be configured to copy the identification of the physical register (e.g., physical register number 0110011), stored in the first field 1104 of the first intra-core register rename map 1002, to a corresponding first field 1104 of the second intra-core register rename map 1004 associated with the first block of instructions 404 and to a corresponding first field 1104 of the third intra-core register rename map 1006 associated with the second block of instructions 502. In this manner, the second intra-core register rename map 1004 and the third intra-core register rename map 1006 can be made to reflect that the physical register number 0110011 is the location of the most recent write to the architectural register K that has been executed by the first core 114-*c*, the most recent write being according to the program order.

In an aspect, the apparatus 2100 can be configured to reference, in conjunction with executing a read instruction, the real-time write mask to determine if the architectural register is an object of a write instruction, of the first block of instructions, that has been executed by the first core, is executing on the first core, or is expected to execute on the first core. For example, with reference to FIGS. 13 and 14, the apparatus 2100 can be configured to reference, in conjunction with executing a read instruction of the second block of instructions 502, the first real-time write mask 1302 to determine if the architectural register K is an object of a write instruction, of the first block of instructions 404, that has been executed by the first core 114-*c*, is executing on the first core 114-*c*, or is expected to execute on the first core 114-*c*. The first real-time write mask 1302 can indicate that the architectural register K was in actuality not the object of the write instruction, of the first block of instructions 404, that has been executed by the first core 114-*c*, is executing on the first core 114-*c*, or is expected to execute on the first core 114-*c*. The first real-time write mask 1302 can indicate the correct state of the architectural register K before the apparatus 2100 can correct the second intra-core register rename map 1004.

In an aspect, a number of the plurality of intra-core register rename maps can be equal to a sum of one added to a number of the blocks of instructions that the first core can be configured to execute concurrently (see FIG. 10). The number of the blocks of instructions that the first core can be configured to execute concurrently can be equal to a number of arrays of reservation stations of the first core (see FIGS. 3 through 9). Execution of one block of instructions conveyed to one array of reservation stations can be a phase of execution for the one array of reservation stations. The second output intra-core register rename map can be an input intra-core register rename map for an initial block of instructions to be executed on the first core during a subsequent phase of execution (see FIG. 10). For example, with reference to FIGS. 10 and 14, the fifth intra-core register rename map 1010 can be an output intra-core register rename map for the fourth block of instructions 702 and an input intra-core register rename map for an initial block of instructions to be executed on the first core 114-c during a subsequent phase of execution.

In an aspect, a second core of the multi-core processor can be configured to operate in conjunction with the first core. The inter-core register rename map can include a first inter-core register rename map associated with the first core and a second inter-core register rename map associated with the second core. For example, with reference to FIG. 14, the second core 114-d can be configured to operate in conjunction with the first core 114-c as the core composition 122. The first core 114-c can be associated with at least the first inter-core register rename map 1416. The second core 114-d can be associated with at least the third inter-core register rename map 1420.

In an aspect, the first inter-core register rename map can include a first first inter-core register rename map for the phase of execution and a second first inter-core register rename map for the subsequent phase of execution. The second inter-core register rename map can include a first second inter-core register rename map for the phase of execution and a second second inter-core register rename map for the subsequent phase of execution. For example, with reference to FIG. 14, the first inter-core register rename map 1416 can be for the phase of execution and the third inter-core register rename map 1420 can be for the subsequent phase of execution. The second inter-core register rename map 1418 can be for the phase of execution and the fourth inter-core register rename map 1422 can be for the subsequent phase of execution.

In an aspect, the apparatus 2100 can be configured to reference, in conjunction with executing a read instruction, the first first inter-core register rename map to determine if the first core includes the physical register that is the location of the most recent write to the architectural register that has been executed by the first core, is executing on the first core, or is expected to execute on the first core, the most recent write being according to the program order. For example, with reference to FIG. 14, if a read instruction of the sixth block of instructions 902 is directed to a particular architectural register and the second field 1106 of the record 1102, of the seventh intra-core register rename map 1408, that corresponds to the particular architectural register does not include an indication that a corresponding physical register is the location of the most recent write to the particular architectural register that has been executed by the second core 114-d, the most recent write being according to the program order, then the apparatus 2100 can reference the second inter-core register rename map 1418 to determine if the first core 114-c includes the physical register that is the location of the most recent write to the particular architectural register that has been executed by the first core 114-c, is executing on the first core 114-c, or is expected to execute on the first core 114-c, the most recent write being according to the program order.

In an aspect, the memory 2102 can be further configured to store an inter-core write mask 2112. The control circuitry 2104 can be further configured to maintain the inter-core write mask 2112. The inter-core write mask 2112 can be associated with the first first inter-core register rename map. The inter-core write mask 2112 can have a bit that corresponds to the architectural register. A value of the bit of the inter-core write mask 2112 can be configured to indicate if the most recent write to the architectural register has been executed by a different core, is executing on the different core, or is expected to execute on the different core, the most recent write being according to the program order. For example, with reference to FIG. 15, the first inter-core write mask 2112 can be associated with the first inter-core register rename map 1416.

In an aspect, the apparatus 2100 can be configured to reference, in conjunction with executing a read instruction and in response to determining that a block of instructions to be executed on the first core during the subsequent phase of execution is the initial block of instructions to be executed on the first core during the subsequent phase of execution, the inter-core write map to determine if the most recent write to the architectural register has been executed by a different core, is executing on the different core, or is expected to execute on the different core, the most recent write being according to the program order.

For example, with reference to FIGS. 14 and 18 and the description of these figures provided above, if the apparatus 2100 determines that the ninth block of instructions (not illustrated) to be executed on the first core 114-c (in a same manner as the first block of instructions 404) during the subsequent phase of execution is the initial block of instructions to be executed on the first core 114-c during the subsequent phase of execution, then the apparatus 2100 can be configured to reference, in conjunction with executing a read instruction, the third inter-core write mask 1806 to determine if the most recent write to the architectural register has been executed by a different core, is executing on the different core, or is expected to execute on the different core, the most recent write being according to the program order. If the read instruction is of the ninth block of instructions and is directed to a particular architectural register, then the apparatus 2100 can reference both the fifth intra-core register rename map 1010 and the third inter-core write mask 1806. If the second field 1106 of the fifth intra-core register rename map 1010 includes an indication that a corresponding physical register is the location of the most recent write to the particular architectural register that has been executed by the first core 114-c, the most recent write being according to the program order, then the apparatus 2100 can reference the third inter-core write mask 1806 because the fifth intra-core register rename map 1010, which was produced from the fourth intra-core register rename map 1008, can lack information about whether the most recent write to the particular architectural register was performed by one of the blocks of instructions executed by the second core 114-d (e.g., the fifth block of instructions 802, the sixth block of instructions 902, the seventh block of instructions 1402, and the eighth block of instructions 1404) during the (same) phase of execution. Reference to the second inter-core write mask 1804 can determine if the most recent write to the particular architectural register has been executed by a different core, is executing on the different core, or is expected to execute on the different core, the most recent write being according to the program order. If the most recent write to the particular architectural register has been executed by the different core, is executing on the different core, or is expected to execute on the different core, the most recent write being according to the program order, then the apparatus 2100 can be configured to reference the third inter-core register rename map 1420 to determine an identification of the different core that includes the physical register that is the location of the most recent write to the particular architectural register, the most recent write being according to the program order.

In an aspect, a value of a bit of the inter-core write mask can be set to one in response to a value of a corresponding field, of the first first inter-core register rename map, that corresponds to the architectural register being different from the identification of the first core. For example, with reference to FIGS. 15, 18, and 19, a value of a bit of the third inter-core write mask 1806 can be set to one in response to a value of a corresponding field 1504 of the third inter-core register rename map 1420 being different from the identification of the first core 114-c (e.g., core number 0).

In an aspect, the apparatus 2100 can be configured to produce, from the inter-core write mask, a modified input intra-core register rename map for the initial block of instructions to be executed on the first core during the subsequent phase of execution. The apparatus 2100 can be configured to produce, from the modified input intra-core register rename map, an output intra-core register rename map for the initial block of instructions to be executed on the first core during the subsequent phase of execution. For example, a value of the second field of the modified input intra-core register rename map can be produced from a value of a corresponding bit of the inter-core write mask and from a value of a corresponding second field of the input intra-core register rename map for the initial block of instructions to be executed on the first core during the subsequent phase of execution. For example, with reference to FIGS. 10, 11, 18, 19, and 20, a value of the second field 1106 of the modified fifth intra-core register rename map 2006 can be produced from a value of a corresponding bit of the third inter-core write mask 1806/2004 and from a value of a corresponding second field 1106 of the fifth intra-core register rename map 1010/2002.

In an aspect, the first second inter-core register rename map can include a first record that corresponds to the architectural register. The first record can be produced from a value of a bit, of a write mask of a block header of the first block of instructions, that corresponds to the architectural register and from a value of a bit, of a write mask of a block header of a second block of instructions, that corresponds to the architectural register. For example, with reference to FIGS. 15 and 16, the second inter-core register rename map 1418 can include the record 1502-J that corresponds to the architectural register J. The record 1502-J can be produced from a value of a bit, of the write mask 1202 of the block header of the first block of instructions 404, that corresponds to the architectural register J and from a value of a bit, of the write mask 1204 of the block header of the second block of instructions 502, that corresponds to the architectural register J.

In an aspect, the second core can be configured to execute a third block of instructions. The second inter-core register rename map can include a second record that corresponds to the architectural register. The second record can be produced from the first record and from a value of a bit, or a write mask of a block header of the third block of instructions, that corresponds to the architectural register. For example, with reference to FIGS. 15 and 17 and the description of these figures provided above, the third inter-core register rename map 1420 can include the record 1502-J that corresponds to the architectural register J. The record 1502-J can be produced from the first record and from a value of a bit, of the write mask 1704 of the block header of the fifth block of instructions 802, that corresponds to the architectural register J.

Figure 22:
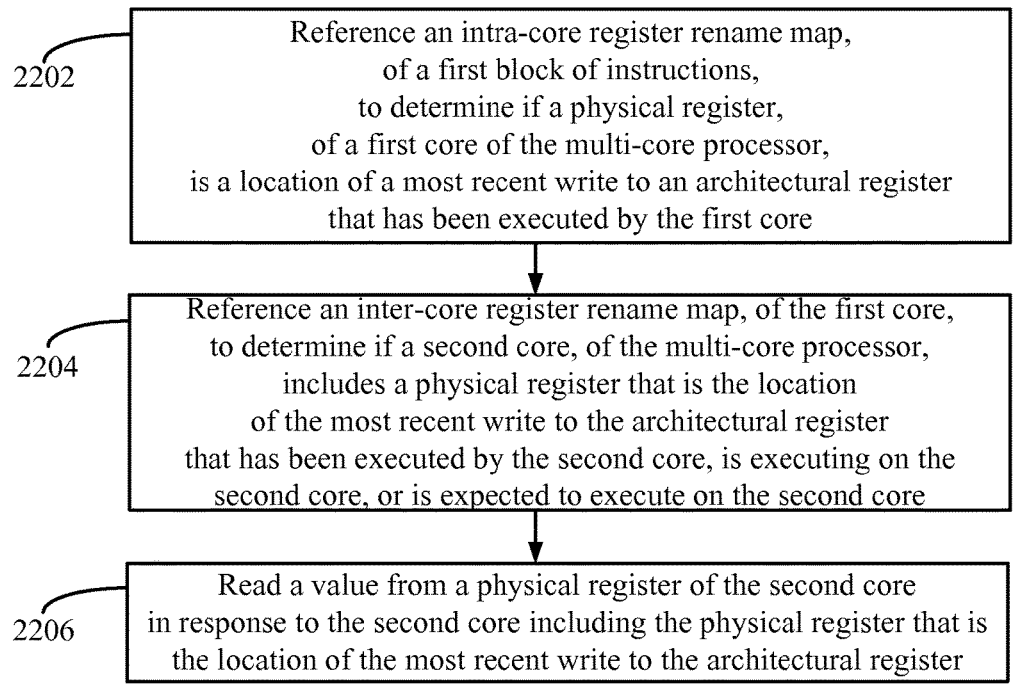
FIGS. 22 through 24 are flow diagrams illustrating examples of methods for executing a read instruction on a multi-core processor.

FIG. 22 is a flow diagram illustrating an example of a method 2200 for executing a read instruction on a multi-core processor. In the method 2200, an operation 2202 can be referencing an intra-core register rename map, of a first block of instructions, to determine if a physical register, of a first core of the multi-core processor, is a location of a most recent write to an architectural register that has been executed by the first core, the most recent write being according to a program order. Advantageously, maintaining the intra-core register rename map can allow the first core to determine an identification of a physical register, of the first core, that can be a location of a most recent write to an architectural register that has been executed by the first core without requiring communication between the first core and another core of the multi-core processor.

An operation 2204 can be referencing an inter-core register rename map, of the first core, to determine if a second core, of the multi-core processor, includes a physical register that is the location of the most recent write to the architectural register that has been executed by the second core, is executing on the second core, or is expected to execute on the second core. If the second core does include a physical register that is the location of the most recent write to the architectural register that has been executed by the second core, is executing on the second core, or is expected to execute on the second core, then reference can be made to an intra-core register rename map, of a final block of instructions that has been executed by the second core, is executing on the second core, or is expected to execute on the second core, to determine an identification of a physical register, of the second core, that is the location of the most recent write to the architectural register that has been executed by the second core.

An operation 2206 can be reading a value from the physical register of the second core in response to the second core including the physical register that is the location of the most recent write to the architectural register.

Figure 23:
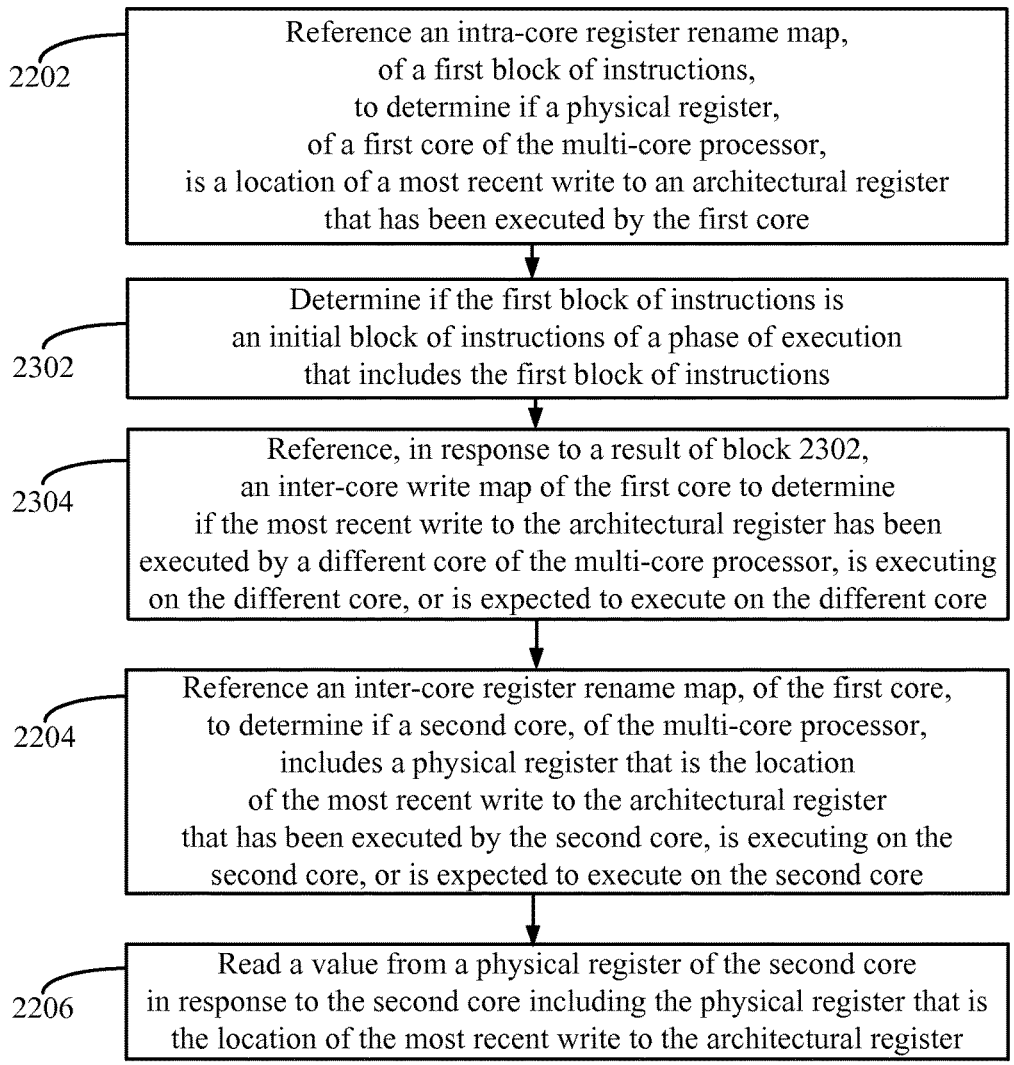

FIG. 23 is a flow diagram illustrating an example of a method 2300 for executing a read instruction on a multi-core processor. In the method 2300, the operation 2202 can be referencing the intra-core register rename map, of the first block of instructions, to determine if the physical register, of the first core of the multi-core processor, is the location of the most recent write to the architectural register that has been executed by the first core, the most recent write being according to the program order. An operation 2302 can be determining if the first block of instructions is an initial block of instructions, of a phase of execution, to be executed on the first core. An operation 2304 can be referencing, in response to a result of the operation 2302, an inter-core write map of the first core to determine if the most recent write to the architectural register has been executed by a different core of the multi-core processor, is executing on the different core, or is expected to execute on the different core. The operation 2204 can be referencing the inter-core register rename map, of the first core, to determine if the second core, of the multi-core processor, includes the physical register that is the location of the most recent write to the architectural register that has been executed by the second core, is executing on the second core, or is expected to execute on the second core. The operation 2206 can be reading the value from the physical register of the second core in response to the second core including the physical register that is the location of the most recent write to the architectural register.

Figure 24:
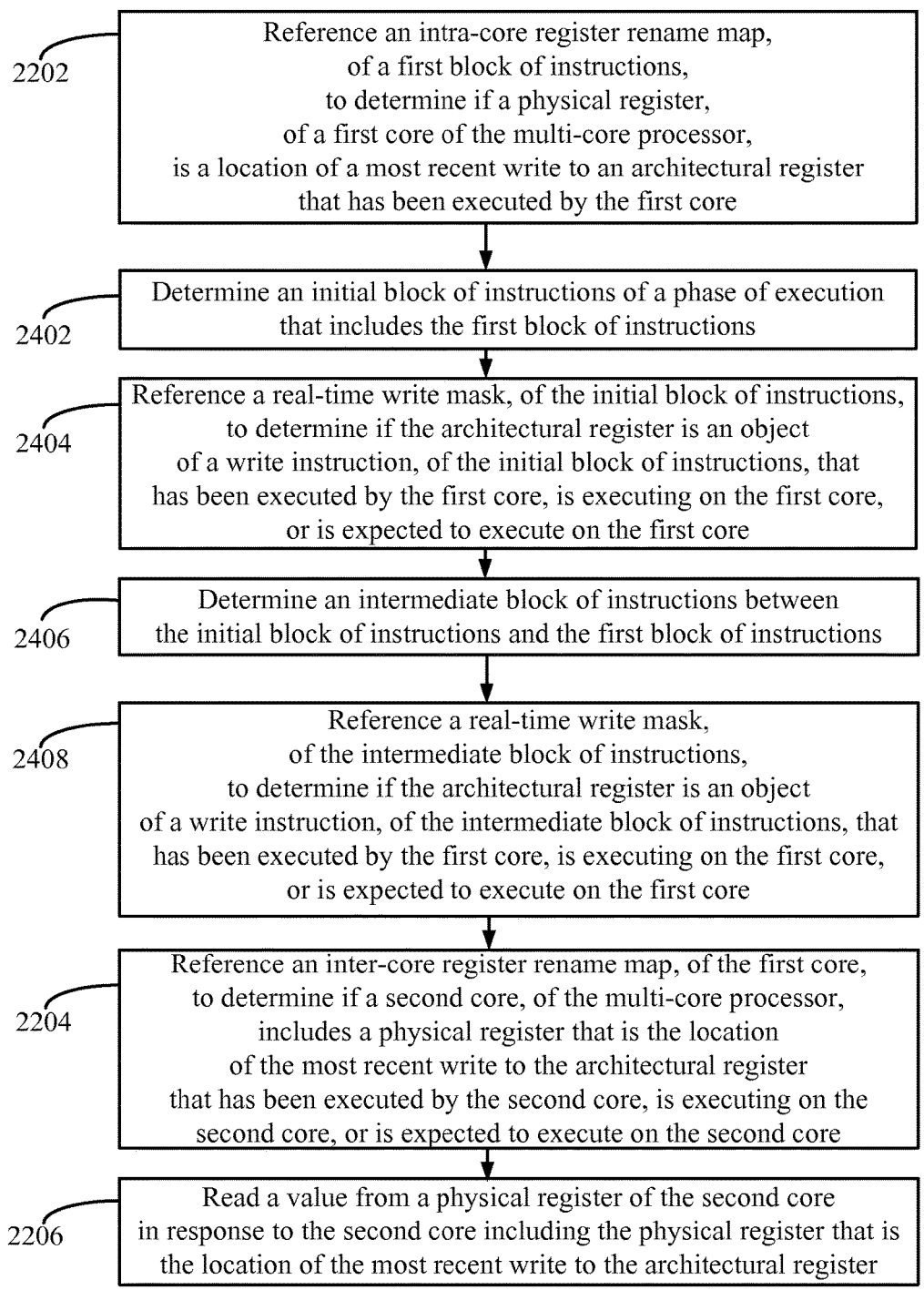

FIG. 24 is a flow diagram illustrating an example of a method 2400 for executing a read instruction on a multi-core processor. In the method 2400, the operation 2202 can be referencing the intra-core register rename map, of the first block of instructions, to determine if the physical register, of the first core of the multi-core processor, is the location of the most recent write to the architectural register that has been executed by the first core, the most recent write being according to the program order. An operation 2402 can be determining an initial block of instructions of a phase of execution that includes the first block of instructions. An operation 2404 can be referencing a real-time write mask, of the initial block of instructions, to determine if the architectural register is an object of a write instruction, of the initial block of instructions, that has been executed by the first core, is executing on the first core, or is expected to execute on the first core. Optionally, an operation 2406 can be determining an intermediate block of instructions between the initial block of instructions and the first block of instructions. Optionally, an operation 2408 can be referencing a real-time write mask, of the intermediate block of instructions, to determine if the architectural register is an object of a write instruction, of the intermediate block of instructions, that has been executed by the first core, is executing on the first core, or is expected to execute on the first core. The operation 2204 can be referencing the inter-core register rename map, of the first core, to determine if the second core, of the multi-core processor, includes the physical register that is the location of the most recent write to the architectural register that has been executed by the second core, is executing on the second core, or is expected to execute on the second core. The operation 2206 can be reading the value from the physical register of the second core in response to the second core including the physical register that is the location of the most recent write to the architectural register.

Figure 25:
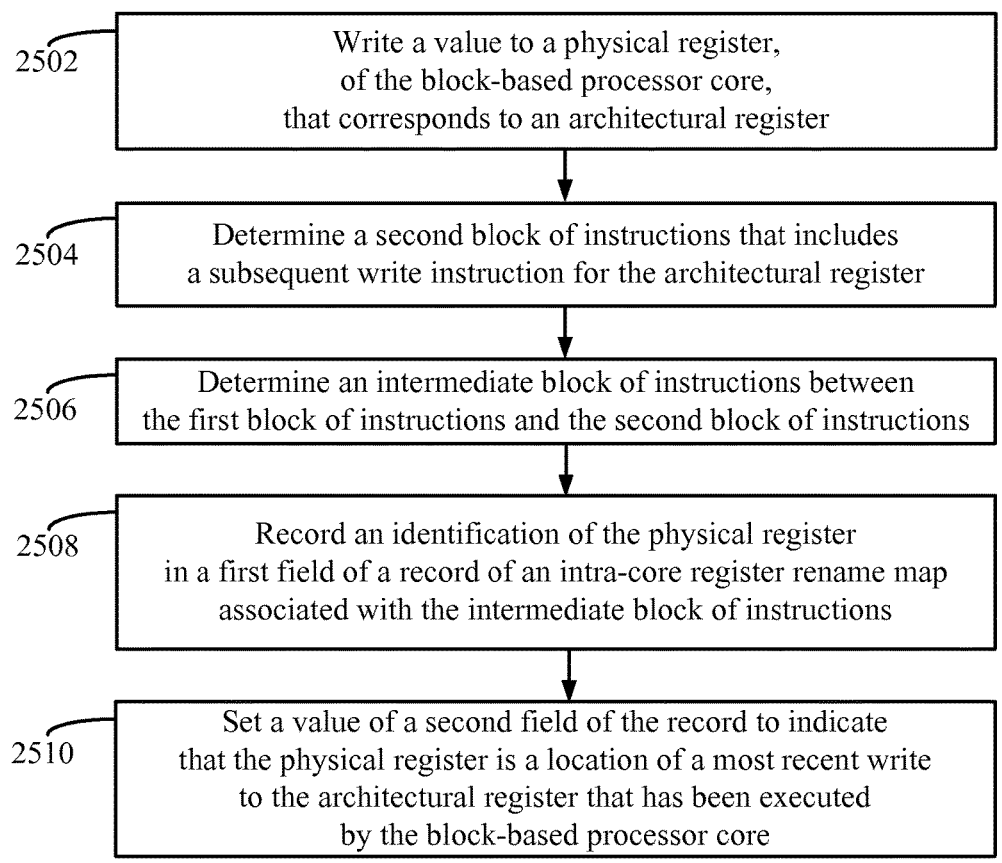
FIG. 25 is a flow diagram illustrating an example of a method for executing a write instruction on a block-based processor core.

FIG. 25 is a flow diagram illustrating an example of a method 2500 for executing a write instruction on a block-based processor core. In the method 2500, an operation 2502 can be writing a value to a physical register, of the block-based processor core, that corresponds to an architectural register. The write instruction can be an instruction of a first block of instructions. An operation 2504 can be determining a second block of instructions that includes a subsequent write instruction for the architectural register. An operation 2506 can be determining an intermediate block of instructions between the first block of instructions and the second block of instructions. An operation 2508 can be recording an identification of the physical register in a first field of a record of an intra-core register rename map associated with the intermediate block of instructions. An operation 2510 can be setting a value of a second field of the record to indicate that the physical register is a location of a most recent write to the architectural register that has been executed by the block-based processor core, the most recent write being according to a program order.

Figure 26:
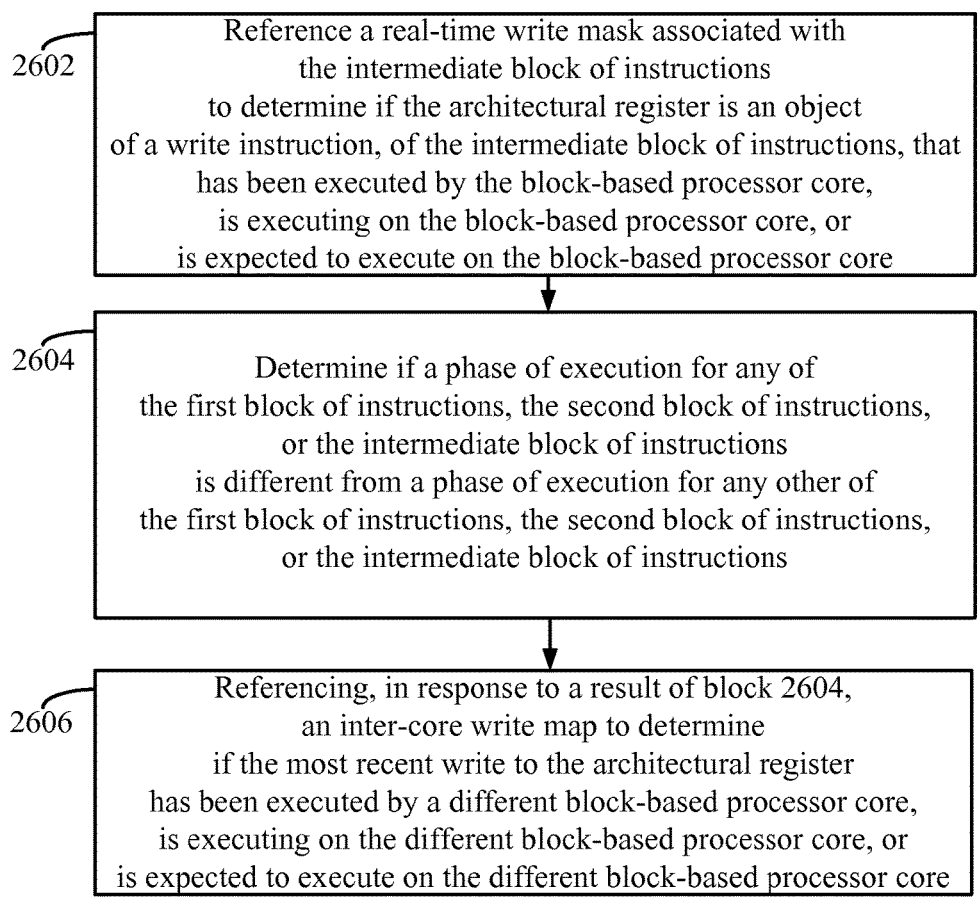
FIG. 26 is a flow diagram illustrating an example of a method for the determining the intermediate block of instructions between the first block of instructions and the second block of instructions referenced in FIG. 25.

FIG. 26 is a flow diagram illustrating an example of a method 2506 for the determining the intermediate block of instructions between the first block of instructions and the second block of instructions. In the method 2506, an operation 2602 can be referencing a real-time write mask associated with the intermediate block of instructions to determine if the architectural register is an object of a write instruction, of the intermediate block of instructions, that has been executed by the block-based processor core, is executing on the block-based processor core, or is expected to execute on the block-based processor core. Optionally, an operation 2604 can be determining if a phase of execution for any of the first block of instructions, the second block of instructions, or the intermediate block of instructions is different from a phase of execution for any other of the first block of instructions, the second block of instructions, or the intermediate block of instructions. Optionally, an operation 2606 can be referencing, in response to a result of the operation 2604, an inter-core write map to determine if the most recent write to the architectural register has been executed by a different block-based processor core, is executing on the different block-based processor core, or is expected to execute on the different block-based processor core.

Those of skill in the art appreciate that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

While the foregoing description provides illustrative aspects, it is noted that various changes and modifications can be made to these illustrative aspects without departing from the scope defined by the appended claims.

What is claimed is:

1. An apparatus for mapping an architectural register to a physical register, the apparatus comprising:

a memory configured to store an intra-core register rename map and an inter-core register rename map, the intra-core register rename map configured to map the architectural register to the physical register of a first core of a multi-core processor, the inter-core register rename map configured to relate the architectural register to an identification of the first core in response to determining that the physical register is a location of a most recent write to the architectural register that has been executed by the first core, is executing on the first core, or is expected to execute on the first core, the most recent write being according to a program order, wherein the multi-core processor is configured according to a block-based microarchitecture, the first core is configured to execute instructions assigned to blocks of instructions, and the blocks of instructions are configured according to a block-based instruction set architecture, wherein the intra-core register rename map comprises a first input intra-core register rename map associated with a first block of instructions, a first output intra-core register rename map associated with the first block of instructions, a second input intra-core register rename map associated with a second block of instructions, and a second output intra-core register rename map associated with the second block of instructions, and wherein the first block of instructions includes a block header having a write mask, the write mask having a bit that corresponds to the architectural register, a value of the bit configured to indicate if the architectural register is an object of a write instruction, of the first block of instructions, that is expected to execute on the first core; and control circuitry configured to maintain the intra-core register rename map and the inter-core register rename map.

2. The apparatus of claim 1, wherein the apparatus is configured to reference, in conjunction with executing a read instruction, the first input intra-core register rename map to determine if the physical register is the location of the most recent write to the architectural register that has been executed by the first core.

3. The apparatus of claim 1, wherein the first output intra-core register rename map is the second input intra-core register rename map.

4. The apparatus of claim 3, wherein the intra-core register rename map comprises a record that corresponds to the architectural register, the record having a first field to store an identification of the physical register that has been mapped to the architectural register, the record having a second field, a value of the second field configured to indicate if the physical register is the location of the most recent write to the architectural register that has been executed by the first core.

5. The apparatus of claim 4, wherein the apparatus is configured to determine, in conjunction with executing a write instruction, an intermediate block of instructions between the first block of instructions and a subsequent block of instructions, the subsequent block of instructions having a subsequent write instruction, and the apparatus is configured to copy the identification of the physical register, stored in the first field of the first output intra-core register rename map, to a corresponding first field of an output intra-core register rename map associated with the intermediate block of instructions.

6. The apparatus of claim 4, wherein a number of the plurality of intra-core register rename maps is equal to a sum of one added to a number of the blocks of instructions that the first core is configured to execute concurrently, the number of the blocks of instructions that the first core is configured to execute concurrently is equal to a number of arrays of reservation stations of the first core, execution of one block of instructions conveyed to one array of reservation stations is a phase of execution for the one array of reservation stations, and the second output intra-core register rename map is an input intra-core register rename map for an initial block of instructions to be executed on the first core during a subsequent phase of execution.

7. The apparatus of claim 6, wherein a second core of the multi-core processor is configured to operate in conjunction with the first core, and the inter-core register rename map comprises a first inter-core register rename map associated with the first core and a second inter-core register rename map associated with the second core.

8. The apparatus of claim 7, wherein the first inter-core register rename map comprises a first first inter-core register rename map for the phase of execution and a second first inter-core register rename map for the subsequent phase of execution, and the second inter-core register rename map comprises a first second inter-core register rename map for the phase of execution and a second second inter-core register rename map for the subsequent phase of execution.

9. The apparatus of claim 8, wherein the apparatus is configured to reference, in conjunction with executing a read instruction, the first first inter-core register rename map to determine if the first core includes the physical register that is the location of the most recent write to the architectural register that has been executed by the first core, is executing on the first core, or is expected to execute on the first core.

10. The apparatus of claim 8, wherein the memory is further configured to store an inter-core write mask, the control circuitry is further configured to maintain the inter-core write mask, the inter-core write mask is associated with the first first inter-core register rename map, the inter-core write mask has a bit that corresponds to the architectural register, a value of the bit of the inter-core write mask is configured to indicate if the most recent write to the architectural register has been executed by a different core, is executing on the different core, or is expected to execute on the different core.

11. The apparatus of claim 10, wherein the apparatus is configured to reference, in conjunction with executing a read instruction and in response to determining that a block of instructions to be executed on the first core during the subsequent phase of execution is the initial block of instructions to be executed on the first core during the subsequent phase of execution, the inter-core write mask to determine if the most recent write to the architectural register has been executed by the different core, is executing on the different core, or is expected to execute on the different core.

12. The apparatus of claim 10, wherein the value of the bit of the inter-core write mask is set to one in response to a value of a corresponding field, of the first first inter-core register rename map, that corresponds to the architectural register being different from the identification of the first core.

13. The apparatus of claim 10, wherein the apparatus is configured to produce, from the inter-core write mask, a modified input intra-core register rename map for the initial block of instructions to be executed on the first core during the subsequent phase of execution, and the apparatus is configured to produce, from the modified input intra-core register rename map, an output intra-core register rename map for the initial block of instructions to be executed on the first core during the subsequent phase of execution.

14. The apparatus of claim 13, wherein a value of the second field of the record of the modified input intra-core register rename map is produced from a value of a corresponding bit of the inter-core write mask and from a value of a corresponding second field of the input intra-core register rename map for the initial block of instructions to be executed on the first core during the subsequent phase of execution.

15. The apparatus of claim 8, wherein the first second inter-core register rename map comprises a first record that corresponds to the architectural register, the first record produced from a value of a bit, of a write mask of a block header of the first block of instructions, that corresponds to the architectural register and from a value of a bit, of a write mask of a block header of a second block of instructions, that corresponds to the architectural register.

16. The apparatus of claim 15, wherein the second core is configured to execute a third block of instructions, wherein the second first inter-core register rename map comprises a second record that corresponds to the architectural register, the second record produced from the first record and from a value of a bit, of a write mask of a block header of the third block of instructions, that corresponds to the architectural register.

17. The apparatus of claim 1, wherein the memory is further configured to store a real-time write mask, the control circuitry is further configured to maintain the real-time write mask, the real-time write mask is associated with the first block of instructions, the real-time write mask has a bit that corresponds to the architectural register, and a value of the bit of the real-time write mask is configured to indicate if the architectural register, that is the object of the write instruction, of the first block of instructions, that is expected to execute on the first core, in actuality is to maintain a value that was written by a write instruction of a previous block of instructions.

18. The apparatus of claim 17, wherein the apparatus is configured to determine, in response to a determination that the architectural register in actuality is to maintain the value that was written by the write instruction of the previous block of instructions, an intermediate block of instructions between the first block of instructions and a subsequent block of instructions having a subsequent write instruction, and the apparatus is configured to copy an identification of the physical register, stored in a first field of the first input intra-core register rename map, to a corresponding first field of the first output intra-core register rename map and to a corresponding first field of an output intra-core register rename map associated with the intermediate block of instructions.

19. The apparatus of claim 17, wherein the apparatus is configured to reference, in conjunction with executing a read instruction, the real-time write mask to determine if the architectural register is the object of the write instruction, of the first block of instructions, that has been executed by the first core, is executing on the first core, or is expected to execute on the first core.

20. A method for executing a read instruction on a multi-core processor, the method comprising:
  referencing an intra-core register rename map, of a first block of instructions, to determine if a physical register, of a first core of the multi-core processor, is a location of a most recent write to an architectural register that has been executed by the first core, the most recent write being according to a program order; and
  referencing an inter-core register rename map, of the first core, to determine if a second core, of the multi-core processor, includes a physical register that is the location of the most recent write to the architectural register that has been executed by the second core, is executing on the second core, or is expected to execute on the second core;
  reading a value from the physical register of the second core in response to the second core including the physical register that is the location of the most recent write to the architectural register;
  determining if the first block of instructions is an initial block of instructions, of a phase of execution, to be executed on the first core; and
  referencing, in response to the first block of instructions being the initial block of instructions, an inter-core write mask of the first core to determine if the most recent write to the architectural register has been executed by a different core of the multi-core processor, is executing on the different core, or is expected to execute on the different core.

21. The method of claim 20, further comprising: determining the initial block of instructions of the phase of execution that includes the first block of instructions; and referencing a real-time write mask, of the initial block of instructions, to determine if the architectural register is an object of a write instruction, of the initial block of instructions, that has been executed by the first core, is executing on the first core, or is expected on the first core.

22. The method of claim 21, further comprising:
  determining an intermediate block of instructions between the initial block of instructions and the first block of instructions; and
  referencing a real-time write mask, of the intermediate block of instructions, to determine if the architectural register is an object of a write instruction, of the intermediate block of instructions, that has been executed by the first core, is executing on the first core, or is expected to execute on the first core.

23. A method for executing a write instruction on a block-based processor core, the method comprising:
  writing a value to a physical register, of the block-based processor core, that corresponds to an architectural register, the write instruction being an instruction of a first block of instructions;
  determining a second block of instructions that includes a subsequent write instruction for the architectural register;
  determining an intermediate block of instructions between the first block of instructions and the second block of instructions;
  recording an identification of the physical register in a first field of a record of an intra-core register rename map associated with the intermediate block of instructions; and
  setting a value of a second field of the record to indicate that the physical register is a location of a most recent write to the architectural register that has been executed by the block-based processor core, the most recent write being according to a program order,
  wherein the determining the intermediate block of instructions comprises referencing a real-time write mask associated with the intermediate block of instructions to determine if the architectural register is an object of a write instruction, of the intermediate block of instructions, that has been executed by the block-based processor core, is executing on the block-based processor core, or is expected to execute on the block-based processor core.

24. The method of claim 23, wherein the determining the intermediate block of instructions further comprises:
  determining if a phase of execution for any of the first block of instructions, the second block of instructions, or the intermediate block of instructions is different from a phase of execution for any other of the first block of instructions, the second block of instructions, or the intermediate block of instructions; and
  referencing, in response to the phase of execution for the any of the first block of instructions, the second block of instructions, or the intermediate block of instructions being different from the phase of execution for the any other of the first block of instructions, the second block of instructions, or the intermediate block of instructions, an inter-core write map to determine if the most recent write to the architectural register has been executed by a different block-based processor core, is executing on the different block-based processor core, or is expected to execute on the different block-based processor core.

* * * * *